(12) United States Patent
Moore et al.

(10) Patent No.: US 7,225,688 B2
(45) Date of Patent: *Jun. 5, 2007

(54) NIP WIDTH SENSING SYSTEM AND METHOD

(75) Inventors: Robert H. Moore, Winchester, VA (US); William B. Kennedy, Yarmouth Port, MA (US)

(73) Assignee: Stowe Woodward LLC, Middletown, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/909,178

(22) Filed: Jul. 30, 2004

(65) Prior Publication Data

US 2005/0000303 A1    Jan. 6, 2005

Related U.S. Application Data

(62) Division of application No. 10/444,289, filed on May 23, 2003, now Pat. No. 6,769,314, which is a division of application No. 09/252,203, filed on Feb. 18, 1999, now Pat. No. 6,568,285.

(60) Provisional application No. 60/075,237, filed on Feb. 19, 1998.

(51) Int. Cl.
  *G01L 5/00*    (2006.01)
  *G01L 5/00*    (2006.01)

(52) U.S. Cl. .................................. 73/862.55

(58) Field of Classification Search .................. 73/158, 73/159, 862.55
  See application file for complete search history.

(56) References Cited

U.S. PATENT DOCUMENTS 3,418,850 A    12/1968   Goddin
3,895,288 A    7/1975    Lampen et al.
4,016,756 A    4/1977    Kunkle
4,049,023 A *  9/1977    Frazier ........................ 139/339
4,233,011 A    11/1980   Bolender et al.
4,494,105 A    1/1985    House (Continued)

FOREIGN PATENT DOCUMENTS

JP    60-15533    1/1985

(Continued)

OTHER PUBLICATIONS

Communication Pursuant to Article 96(2) EPC for corresponding European patent application No. 00 905 646.6-2202 mailed on May 2, 2005.

(Continued)

*Primary Examiner*—Max Noori
(74) *Attorney, Agent, or Firm*—Myers Bigel Sibley & Sajovec

(57) ABSTRACT

Devices for measuring a nip width between rolls of a press nip include one or more sensors adapted to be placed in the nip while the nip is stationary. The electrical resistance of each sensor corresponds to the size of the nip width, whereby a nip width or a nip width distribution may be determined by measuring the sensor resistance(s). Methods of measuring a nip width distribution include providing a plurality of force sensitive resistor sensors each of which respond to pressure applied thereto to provide a variable sensor resistance as a function of the amount of pressure and the area of the pressure exerted on the sensor.

27 Claims, 21 Drawing Sheets

U.S. PATENT DOCUMENTS

| | | | |
|---|---|---|---|
| 4,509,237 | A | 4/1985 | Volz et al. |
| 4,520,723 | A | 6/1985 | Pav et al. |
| 4,712,472 | A | 12/1987 | Meisen et al. |
| 4,729,153 | A | 3/1988 | Pav et al. |
| 4,898,012 | A | 2/1990 | Jones et al. |
| 4,963,702 | A | 10/1990 | Yaniger et al. |
| 5,048,353 | A | 9/1991 | Justus |
| 5,379,652 | A | 1/1995 | Allonen |
| 5,383,371 | A | 1/1995 | Laitinen |
| 5,562,027 | A | 10/1996 | Moore |
| 5,583,303 | A | 12/1996 | Franz |
| 5,592,875 | A | 1/1997 | Moschel |
| 5,598,639 | A * | 2/1997 | Webb ............ 33/784 |
| 5,699,729 | A | 12/1997 | Moschel |
| 5,745,820 | A * | 4/1998 | Iwakura et al. ............ 399/45 |
| 5,821,433 | A | 10/1998 | Goldman et al. |
| 5,953,230 | A | 9/1999 | Moore |
| 6,002,098 | A | 12/1999 | Pircher et al. |
| 6,205,369 | B1 | 3/2001 | Moore |
| 6,360,612 | B1 | 3/2002 | Trantzas et al. |
| 6,370,961 | B1 | 4/2002 | Trantzas et al. |
| 6,430,459 | B1 | 8/2002 | Moore |
| 6,474,403 | B1 | 11/2002 | Nikolovski et al. |
| 6,568,285 | B1 * | 5/2003 | Moore et al. ............ 73/862.55 |
| 6,769,314 | B2 * | 8/2004 | Moore et al. ............ 73/862.55 |

FOREIGN PATENT DOCUMENTS

| | | |
|---|---|---|
| JP | 60-15534 | 1/1985 |
| JP | 62-165135 | 7/1987 |
| JP | 01-157850 | 6/1989 |
| JP | 04-221727 | 8/1992 |
| JP | 06-182977 | 7/1994 |
| WO | WO 96/28718 | 9/1996 |
| WO | WO 96/38718 | 12/1996 |

OTHER PUBLICATIONS

Measurements of pressure distribution between metal and rubber covered rollers; G. J. Parish; British Journal of Applied Physics; vol. 9, Apr. 1958, pp. 158-161.

A Study of Rubber Covered Press Roll Nip Dynamics; James P. McNamee; The Journal of the Technical Association of the Pulp and Paper Industry; vol. 48, No. 12; Dec. 1965, pp. 673-679.

Experimental Investigation of Rolling Contact; Aris C. Spengos; Journal of Applied Mechanics; Dec. 1965, pp. 859-864.

Embedded Strain Gages for the Measurement of Strains in Rolling Contact; A. Bazergui et al.; Experimental Mechanics, Oct. 1968, pp. 433-441.

Soft calender nip: an interesting subject for research and measurement; J. Koriseva et al.; Paper and Timber, 73(1991):5, pp. 419-423.

Measurement of the Pressure-Time Profile in a Rolling Calender Nip; Samuel F. Keller; 77th Annual Meeting of the Canadian Section of the Pulp and Paper Assn., 1991, pp. B89-B96.

Transducers and Techniques of Contact Pressure Measurement; Terry L. Merriman; The Society for Experimental Mechanics, Spring Conference, Jun. 1991, pp. 318-320.

Declaration of William B. Kennedy Under 37 C.F.R. §1.132, dtd. Aug. 23, 1999.

PCT International Search Report PCT/US00/01120 (filing date Jan. 18, 2000; priority date Feb. 18, 1999).

*Product Data Sheet* from Acheson Colloids Co. ID 8109841446, Jul. 29, 1998 pp. 2/3 & 3/3.

Carl D. Todd et al; *The Potentiometer Handbook*, Users' Guide to Cost-Effective Applications; McGraw-Hill Book Company.

William M. Lindenfelser; *Xerox Disclosure Journal;* vol. 15, No. 4 Jul./Aug. 1990.

Interlink Electronics; *FSR Integration Guide and Standard Parts Catalog.*

Interlink Electronics; State-of-the-Art Pointing Solutions for the OEM; *FSR Integration Guide and Evaluation Parts Catalog.*

* cited by examiner

NIP WIDTH SENSING SYSTEM AND METHOD

RELATED APPLICATION

This application is a divisional application of and claims priority from application Ser. No. 10/444,289; filed May 23, 2003, now U.S. Pat. No. 6,769,314, which is a divisional of application Ser. No. 09/252,203, filed Feb. 18, 1999, issued on May 27, 2003 as U.S. Pat. No. 6,568,285, which claims priority from Provisional Application Ser. No. 60/075,237, filed Feb. 19, 1998.

FIELD OF THE INVENTION

The present invention relates to a system and method for use in connection with nipped rollers and rollers nipped with shoes such as those used in papermaking, steel making, plastics calendering and printing machines, and, more particularly, to such a system and method which are capable of determining the nip width distribution between the nipped rollers.

BACKGROUND OF THE INVENTION

Nipped rolls are used in a vast number of continuous process industries including papermaking, steel making, plastics calendering and printing. The characteristics of nipped rolls are particularly important in papermaking. In the process of papermaking, many stages are required to transform headbox stock into paper. The initial stage is the deposition of the headbox stock onto paper machine clothing or felt. Upon deposition, the white water forming a part of the stock flows through the interstices of the felt, leaving a mixture of water and fiber thereon. The felt then supports the mixture, leading it through several dewatering stages such that only a fibrous web or matt is left thereon.

One of the stages of dewatering takes place in the press section of the papermaking process. In the press section, two or more cooperating rolls press the fiberous web as it travels on the felt between the rolls. The rolls, in exerting a great force on the felt, cause the web traveling thereon to become flattened, thereby achieving a damp fibrous matt. The damp matt is then led through several other dewatering stages.

The amount of nip pressure applied to the web is important in achieving uniform sheet characteristics. Variations in nip pressure can affect sheet moisture content and sheet properties. Excessive pressure can cause crushing of fibers as well as holes in the resulting paper product. Conventional methods addressing this problem have been inadequate and, thus, this problem persists in the press section, often resulting in paper of poor quality, having uneven surface characteristics.

Roll deflection, commonly due to sag or nip loading, is a source of uneven pressure distribution. Worn roll covers may also introduce pressure variations. Rolls have been developed which monitor and alter the roll crown to compensate for such deflection. Such rolls usually have a floating shell which surrounds a stationary core. Underneath the floating shell are pressure regulators which detect pressure differentials and provide increased pressure to the floating shell when necessary.

Notwithstanding the problem of roll deflection, the problem of uneven loading across the roll length and in the cross machine direction persists because pressure is often unevenly applied along the roll. For example, if roll loading in a roll is set to 200 pounds per inch, it may actually be 300 pounds per inch at the edges and 100 pounds per inch at the center.

Methods have been used to discover discrepancies in applied pressure. One such method known as taking a nip impression requires stopping the roll and placing a long piece of carbon paper, foil, or impressionable film in the nip. One must load the rolls carefully to ensure that both sides, that being front and back, are loaded evenly. The pressure in the nip transfers a carbon impression, deforms the foil, or ruptures ink containing capsules in the film, indicating the width of contact. These methods for taking a nip impression are not reusable as they determine only a single event such as the highest pressure or contact width.

One of the major difficulties in using the nip impression procedure is that of evenly loading the rolls from front to back. The goal of the procedure is to measure and record the final stable loading along the length of the rolls after the initial loading. Often, during the initial loading, however, one end will contact before the other end. Thus, there are times when one end is heavily loaded while the other end is only slightly loaded. When this occurs, the nip impression shows the highly loaded condition and not the final state because the carbon paper, foils, and Prescale films record the largest width and/or highest pressures.

Another method of determining the nip pressure profile is to use a Prescale film that measures pressure. The film is fed into the nip after the rolls are loaded. Therefore, the film records the stable loaded condition rather than the greatest consequence of the loading process. Such a process eliminates the loading difficulties associated with nip impressions. Nonetheless, the Prescale films must be interpreted using a densitometer. This process is cumbersome, time consuming, and generally inefficient. Furthermore, the Prescale films are not reusable. A new piece of film must be fed into the nip after any corrective adjustments are made. Lastly, the Prescale films are temperature and moisture dependent, thus leading to inaccurate and unreliable results.

After a successful nip impression is taken, the carbon paper, foils, and Prescale films are removed from the nip and examined. Typically, the nip width is measured at twenty-one locations across the machine. These readings should be accurate to the nearest 1/64" or 0.01" for accurate interpretation. These measurements are time consuming and are subject to operator variations. Also, if the measurements require a change in the nip settings, a new piece of carbon paper foil, or Prescale film must again be placed in the nip. A common practice is to postpone performance of a confirming test until the next available shutdown. Thus, the processing may continue at a less than optimal state.

Crown corrections are often made from nip width measurements. For simple crown corrections, the amount of correction may be estimated from:

$$C = (N_E^2 - N_C^2)\frac{D_1 + D_2}{2D_1 D_2}$$

where $N_E$ is the nip width at the end of the roll, $N_C$ is the nip width at the center of the roll, and $D_1$ and $D_2$ are the roll diameters.

This equation is used throughout the paper industry for estimating crown corrections.

Various methods have been used to alleviate some of the challenges discussed previously. In U.S. Pat. No. 3,906,800 to Thettu, a reusable nip measuring device and method are disclosed. This method uses two polyamide sheets, one of which is coated with silicone rubber. When placed in the nip and when the nip is closed, the two sheets contact and fuse within the contact region. The nip is reopened, the sheets are removed, and the nip width distribution may be measured in a manner similar to carbon paper, foils, and Prescale films. Thus, the interpretation times are not improved. This method has the advantage of reusability, but is subject to the same loading path challenges in that it will record the greatest contact width and not necessarily the final stable state.

In U.S. Pat. No. 4,744,253 to Hermkens, a system is disclosed that uses ultrasonic waves to determine the thickness of a thin film sensor. The time difference between the transmission pulse and the received pulse is related to the pressure on the sensor. This time difference is used to measure the sensor cladding thickness, which is related to the applied pressure. Because this technique does not provide nip width measurements, it is inconvenient to use to make crown corrections.

In U.S. Pat. No. 4,016,756 to Kunkle, a nip load sensing device is disclosed. This device uses a bar containing load cells that are placed in the nip. The method provides discrete load reading across the machine, but does not produce nip width measurements. Thus, crown corrections do not follow directly.

U.S. Pat. No. 5,379,652 to Allonen discloses a method and device for measuring nip force and/or nip pressure in a nip. The Allonen system measures nip pressure, rather than nip width, and uses information gathered during the measurement of nip pressure to estimate nip width. Ordinarily, the piezoelectric sensors employed by Allonen require a dynamic event (such as passing through a nip) in order to operate because such sensors measure changes in pressure and vary the signal based on the amount of pressure.

U.S. Pat. No. 5,383,371 to Laitenen discloses a method and device for measurement of nip force and/or nip pressure in a nip formed by a revolving roll or a band used in the manufacture of paper. This device also employs force or pressure detectors formed of piezoelectric film. The device may be used to estimate nip width, but similarly requires a dynamic event, namely, that the measurements be made as the sensors are passed through the press nip.

U.S. Pat. No. 5,048,353 to Justus discloses a method and apparatus for roll profile measurement which also employs piezoelectric sensors.

PCT Application PCT/US96/08204 (International Publication WO 96/38718), assigned to the applicant, discloses a nip pressure and nip width sensing system, certain embodiments of which are directed to measuring nip width using pressure sensitive pads or lines.

SUMMARY OF THE INVENTION

An object of the present invention is to measure a nip width between a pair of nipped rolls.

An object of the invention is to measure nip width distribution along the length of a roll in a press nip.

Another object of the invention is to measure nip width distribution in the cross machine direction in a press nip.

Yet another object of the invention is to measure pressure distribution along the length of a roll in a press nip.

Still another object of the invention is to provide a reusable sensing system capable of measuring nip widths at multiple press nip locations, as well as pressure distribution and nip widths on different length rolls.

Moreover, it is yet another object of the invention to adjust the crown in response to irregular nip width distributions.

It is yet another object of the invention to adjust the crown in response to irregular pressure distributions.

A further object of the invention is to adjust the journal forces or applied loads in response to irregular nip width distributions.

It is yet another object of the invention to adjust the journal forces or applied loads in response to irregular pressure distributions.

Moreover, an object of the invention is to provide a method of determining the nip width in a press nip.

It is still another object of the invention to provide a method of determining the pressure in a press nip.

These and other objects of the present invention are achieved by devices for measuring a nip width between two rolls of a press nip, each of the devices including one or more sensors adapted to be placed in a stationary nip and to measure the nip width thereof, and methods for using the same. The electrical resistance of each sensor corresponds to the size of the nip width, whereby a nip width or a nip width distribution may be determined by measuring the sensor resistances. The sensors according to the invention may provide substantially direct correspondence between sensor resistance and nip width. According to methods of the present invention, nip width may be estimated from the measured resistances of force sensitive resistor sensors.

According to certain preferred embodiments, a device for measuring a nip width includes a sensor assembly. The sensor assembly includes a first strip formed of a first electrically conductive material having a resistance. The first strip has a first end and a second end and a first measuring zone between the first and second ends. A second strip is disposed adjacent the first strip and is formed of a second electrically conductive material. The second strip has a second measuring zone disposed adjacent and substantially coextensive with the first measuring zone. A gap is defined between the first and second strips and electrically isolates the first and second strips from one another. At least one of the first and second strips is deformable such that, when the device is placed in the press nip, pressure from the nip rolls forces portions of the first and second measuring zones into electrically conductive contact with one another. The area of the contact substantially directly corresponds to the nip width. The device further includes resistance measuring means for measuring an electrical resistance across the first measuring zone.

The resistance measuring means may include first and second leads. The first lead is connected to a voltage source and to the first strip adjacent the first end. The second lead is connected to the first strip adjacent the second end and to a ground. Preferably, substantially no current flows through the second strip when the first and second strips are not in contact. The first and second materials may be the same. The first material may have a higher electrical resistance than the second material. One or more compressible edge supports may be provided to maintain the gap when the sensor is unloaded and to allow the first and second strips to make contact when the sensor is placed in the press nip.

The device may include a strip and a plurality of the sensors mounted thereon. A temperature sensor may be provided to measure a temperature in the press nip and to generate a temperature compensation signal. The device may include means for detecting when an end edge of the sensor assembly is positioned within the press nip.

In a device as described above, the resistance measuring means may include a first lead connected to a ground and to the first strip adjacent the first end, a second lead connected to a ground and to the first strip adjacent the second end, a voltage source, and a third lead connected to the voltage source and to the second strip. A first resistor may be provided in the first lead between the first strip and ground, and a second resistor may be provided in the second lead between the first strip and ground.

The present invention is further directed to a device for measuring a nip width including a sensor assembly having first, second and third strips. The first strip is formed of a first electrically conductive material. The second strip is spaced apart from the first strip and is formed of a second electrically conductive material. The third strip is mounted on the second strip between the first and second strips and has first and second opposed contact surfaces. The first contact surface faces the first strip and the second contact surface electrically contacts the second strip. The third strip is formed of a semiconductor material operative to substantially prevent current flow through the semiconductor material except between the contact surfaces. A gap is defined between the first strip and the first contact surface and electrically isolates the first strip and the third strip from one another. At least one of the first strip and the second and third strips is deformable such that, when the device is placed in the press nip, the nip rolls force portions of the first strip and the first contact surface into electrically conductive contact with one another. The area of the contact substantially directly corresponds to the nip width. The device further includes resistance measuring means for measuring a resistance across the first, second and third strips. The resistance measuring means includes a voltage source, a first lead connecting the voltage source to the first strip and a second lead connecting the voltage source to the second strip.

The third strip may include segments of the semiconductor material insulated from one another. The semiconductor material may be orthotropic. According to certain preferred embodiments, the third strip has a thickness of no greater than 0.2 inch. The semiconductor material may include a filled composite comprising a non-conductive medium and conductive particles held in the non-conductive medium. The device may further include a fourth strip mounted on the first strip between the first and second strips and having first and second opposed contact surfaces, the first contact surface facing the second strip and the second contact surface electrically contacting the first strip. The fourth strip is formed of a semiconductor material operative to substantially prevent current flow through the semiconductor material except between the contact surfaces. When the device is placed in the press nip, the nip rolls force portions of the first contact surfaces of the third and fourth strips into electrically conductive contact with one another. The area of the contact substantially directly corresponds to the nip width.

The present invention is further directed to a device for measuring a nip width including a sensor assembly having first, second, and third strips and a force sensitive resistor material layer. The first strip is formed of a first electrically conductive material. The second strip is spaced apart from the first strip and is formed of a second electrically conductive material. The third strip is mounted on the second strip between the first and second strips and has first and second opposed contact surfaces. The first contact surface faces the first strip and the second contact surface electrically contacts the second strip. The third strip is formed of a semiconductor material operative to substantially prevent current flow through the semiconductor material except between the contact surfaces. The force sensitive resistive material layer is interposed between the first strip and the first contact surface. The force sensitive resistive material layer is operative to electrically isolate the first strip and the third strip from one another when in a relaxed state and to electrically connect the first strip and the third strip when a prescribed pressure is applied to the force sensitive resistive material layer. At least one of the first strip and the second and third strips are deformable such that, when the device is placed in the press nip, the nip rolls force portions of the first and second strips toward one another, thereby compressing a corresponding portion of the force sensitive resistive material layer, the area of the corresponding portion corresponding to the nip width. The device further includes resistance measuring means for measuring a resistance across the first, second and third strips. The resistance measuring means includes a voltage source, a first lead connecting the voltage source to the first strip and a second lead connecting the voltage source to the second strip.

The semiconductor layer of the sensor may be formed in the manner described above. The sensor may include a fourth strip of semiconductor material as described above.

The present invention is directed to a device for measuring a nip width between two rolls of a press nip for which a largest expected nip width is known. The device includes a sensor assembly having a sensor length and a sensor width and adapted for placement in the press nip such that the sensor length extends across the nip width and perpendicular to the roll axes. The sensor assembly includes a plurality of substantially parallel membrane switches. The membrane switches extend substantially perpendicular to the sensor length and are arranged in successive, spaced apart relation along the sensor length. At least two of the membrane switches are spaced apart from one another along the sensor length a distance greater than the largest expected nip width. A plurality of electrically conductive lead lines are each connected to a respective one of the membrane switches.

The present invention is directed to a device for measuring a nip width between two rolls of a press nip for which a largest expected nip width is known. The device includes a sensor assembly, the sensor assembly having a sensor length and a sensor width and being adapted for placement in the press nip such that the sensor length extends across the nip width and perpendicular to the roll axes. The sensor assembly includes a first and second spaced apart lead lines extending along at least a portion of the sensor. A plurality of membrane switches are arranged in successive, spaced apart relation along the sensor length. At least two of the membrane switches are spaced apart from one another along the sensor length a distance greater than the largest expected nip width. Each of the membrane switches is disposed between and electrically connected to each of the first and second lead lines such that each membrane switch is in electrically parallel relation to each of the other membrane switches.

A plurality of resistors may be disposed between and electrically connected to each of the first and second lead lines, each resistor being electrically connected in series relation to a respective one of the plurality of membrane switches. The membrane switches may be spaced apart along the sensor width. The first and second lead lines may extend along at least a portion of the sensor length and may be spaced apart from one another along the sensor width. Each of the membrane switches may include a dot having a diameter greater than the spacing between adjacent membrane switches along the sensor length.

The present invention is directed to a method of measuring a nip width between two rolls of a press nip. The method includes estimating a largest expected nip width between the rolls and selecting and providing a device for measuring the nip width. The device includes a plurality of sensor assemblies. Each of the sensor assemblies includes a force sensitive resistor sensor responsive to pressure applied to the force sensitive resistor to provide a variable sensor resistance as a function of the amount of pressure and the area of the pressure exerted on the sensor. Each of the sensors has a sensing length greater than the largest expected nip width. Electronics for determining the sensor resistances of the plurality of sensors are provided. The sensors are mounted in the press nip such that each of the sensors extends lengthwise across the nip width, whereby each sensor is subjected to a respective nip pressure over a contact area corresponding to the nip width at the respective sensor's location. While the rolls are stationary, the sensor resistance of each of the sensors along the nip width is determined. A line load between the rolls is determined. Each of the sensor resistances is scaled as a function of the line load to determine a scaled line load value corresponding to each sensor resistance. A lip width corresponding to each scaled line load value is determined.

The present invention is also directed to a method of measuring a nip width between two rolls of a press nip including the steps of estimating a largest expected nip width between the rolls and selecting and providing a device for measuring the nip width as described above. Each of the sensors is characterized by determining the resistance response of each sensor as a function of pressure and contact area. The strip is mounted in the press nip such that the strip extends lengthwise along the lengths of the rolls and each of the sensors extends lengthwise across the nip width, whereby each sensor is subjected to a respective nip pressure over a contact area corresponding to the nip width at the respective location. While the rolls are stationary, the sensor resistance of each of the sensors along the nip width is determined. For each sensor, a reference line load corresponding to the determined sensor resistance is determined. A nip width corresponding to each determined reference line load is determined.

The present invention is also directed to a method of measuring a nip width between two rolls of a press nip including the steps of estimating a largest expected nip width between the rolls and selecting and providing a device for measuring the nip width as described above. Each of the sensors is characterized by determining the resistance response of each sensor as a function of nip width. The strip is mounted in the press nip such that the strip extends lengthwise along the lengths of the rolls and each of the sensors extends lengthwise across the nip width, whereby each sensor is subjected to a respective nip pressure over a contact area corresponding to the nip width at the respective location. While the rolls are stationary, the sensor resistance of each of the sensors along the nip width is determined. For each sensor, a reference nip width corresponding to the determined sensor resistance is determined.

The present invention is directed to a device for measuring a nip width between two rolls of a press nip for which a largest expected nip width is known. The device includes a sensor assembly having a sensor length and a sensor width and adapted for placement in the press nip such that the sensor length extends across the nip width and perpendicular to the roll axes. The sensor assembly includes a plurality of sensing lines arranged and configured to measure at least the largest expected nip width. The sensing lines include a force sensitive resistive material having a saturation pressure less than a prescribed nominal pressure whereby, when the device is mounted in the press nip, each sensing line positioned in the nip width will be substantially saturated. The device may include a strip and a plurality of the sensors mounted thereon. The device may include first and second opposed, flexible film layers, each of the sensing lines including a first line secured to an inner surface of the first film layer and a second line secured to an inner surface of the second film layer and facing the first line.

The device as described above may be constructed such that the sensing lines are substantially parallel, the sensing lines extend substantially perpendicular to the sensor length, the sensing lines are arranged in successive, spaced apart relation along the sensor length, and at least two of the sensing lines are spaced apart from one another along the sensor length a distance greater than the largest expected nip width. The sensor assembly further includes a plurality of electrically conductive lead lines, each lead line connected to a respective one of the sensing lines.

The device as described above may be constructed such that the sensor assembly includes first and second spaced apart lead lines extending along at least a portion of the sensor. The sensing lines are arranged in successive, spaced apart relation along the sensor length. At least two of the sensing lines are spaced apart from one another along the sensor length a distance greater than the greatest expected nip width. Each of the sensing lines are disposed between and electrically connected to each of the first and second lead lines such that each sensing line is in electrically parallel relation to each of the other sensing lines. A plurality of resistors may be disposed between and electrically connected to each of the first and second lead lines, each resistor being electrically connected in series relation to a respective one of the plurality of sensing lines.

The device as described above may be constructed such that the sensing lines are substantially parallel, the sensing lines extend substantially parallel to the sensor length with a uniform offset spacing along the sensor length between respective ends of the sensing lines, and at least two of the ends of the sensing lines are spaced apart from one another along the sensing length a distance greater than the largest expected nip width. The sensor assembly further includes a plurality of electrically conductive lead lines, each lead line connected to a respective one of the sensing lines.

The device as described above may be constructed such that the sensing lines are substantially parallel, the sensing lines extend at an angle with respect to the sensor length with a uniform offset spacing along the sensor length between respective ends of the sensing lines, and at least two of the ends of the sensing lines being spaced apart from one another along the sensor length a distance greater than the largest expected nip width. The sensor assembly further including a plurality of electrically conductive lead lines, each the lead line connected to a respective one of the sensing lines.

The present invention is further directed to a device for measuring a nip width between two rolls of a press nip for which a largest expected nip width and a largest expected nip pressure are known. The device includes a sensor assembly a sensor length and a sensor width and adapted for placement in the press nip such that the sensor length extends across the nip width and perpendicular to the roll axes. The sensor assembly includes a plurality of sensing lines, the sensing lines arranged and configured to measure at least the largest expected nip width. The sensing lines include a force sensitive resistive material having a saturation pressure at least as great as the largest expected pressure in the nip whereby, when the device is mounted in the press nip, each sensing line positioned in the nip width will be partially actuated so that the electrical resistance of the sensing line is representative of the nip pressure on the sensing line. The device may include a strip and a plurality of the sensors mounted thereon. The device may include first and second opposed, flexible film layers, wherein each of the sensing lines including a first line secured to an inner surface of the first film layer and a second line secured to an inner surface of the second film layer and facing the first line.

The device described above may be constructed such that the sensing lines are substantially parallel, the sensing lines-extend substantially perpendicular to the sensor length, the sensing lines are arranged in successive, spaced apart relation along the sensor length, and at least two of the sensing lines are spaced apart from one another along the sensor length a distance greater than the largest expected nip width. The sensor assembly further including a plurality of electrically conductive lead lines, each lead line connected to a respective one of the sensing lines.

The device as described above may include first and second spaced apart lead lines extending along at least a portion of the sensor. The sensing lines are arranged in successive, spaced apart relation along the sensor length. At least two of the sensing lines are spaced apart from one another along the sensor length a distance greater than the largest expected nip width. Each of the sensing lines are disposed between and electrically connected to each of the first and second lead lines such that each sensing line is in electrically parallel relation to each of the other sensing lines. A plurality of resistors may be disposed between and electrically connected to each of the first and second lead lines, each the resistor being electrically connected in series relation to a respective one of the plurality of sensing lines.

The device as described above may be constructed such that the sensing lines are substantially parallel, the sensing lines extend substantially parallel to the sensor length with a uniform offset spacing along the sensor length between respective ends of the sensing lines, and at least two of the ends of the sensing lines are spaced apart from one another along the sensing length a distance greater than the largest expected nip width. The sensor assembly further including a plurality of electrically conductive lead lines, each lead line connected to a respective one of the sensing lines.

The device described above may be constructed such that the sensing lines are substantially parallel, the sensing lines extend at an angle with respect to the sensor length with a uniform offset spacing along the sensor length between respective ends of the sensing lines, and at least two of the ends of the sensing lines are spaced apart from one another along the sensor length a distance greater than the largest expected nip width. The sensor assembly further includes a plurality of electrically conductive lead lines, each lead line connected to a respective one of the sensing lines.

According to the invention, the sensors as described above may be incorporated into a roll sensing system for measuring the pressure distribution and nip width in a nip. The sensing system comprises a strip having the sensors thereon, the strip being placed between rolls in a press nip for sensing the pressure and/or nip width at several locations along the roll. Electronics associated with the sensors communicate with an optional multiplexer and a bidirectional transmitter for signal transmission to an external signal conditioner and an external computer. The computer determines pressure values and nip width values at various locations along the strip, and communicates such values to a display which provides graphical and/or numerical data visually to the operator. Optionally, a control system can be in communication with the transmitter or the computer to initiate crown corrections in response to pressure or nip width readings.

BRIEF DESCRIPTION OF THE DRAWINGS

Preferred embodiments of the invention are described below with reference to the following figures wherein like numerals represent like parts.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The term "strip" as used herein means a strip, plate or layer of coherent material having significant width and length dimensions and a relatively small thickness as compared to its width and length dimensions.

Figure 1:
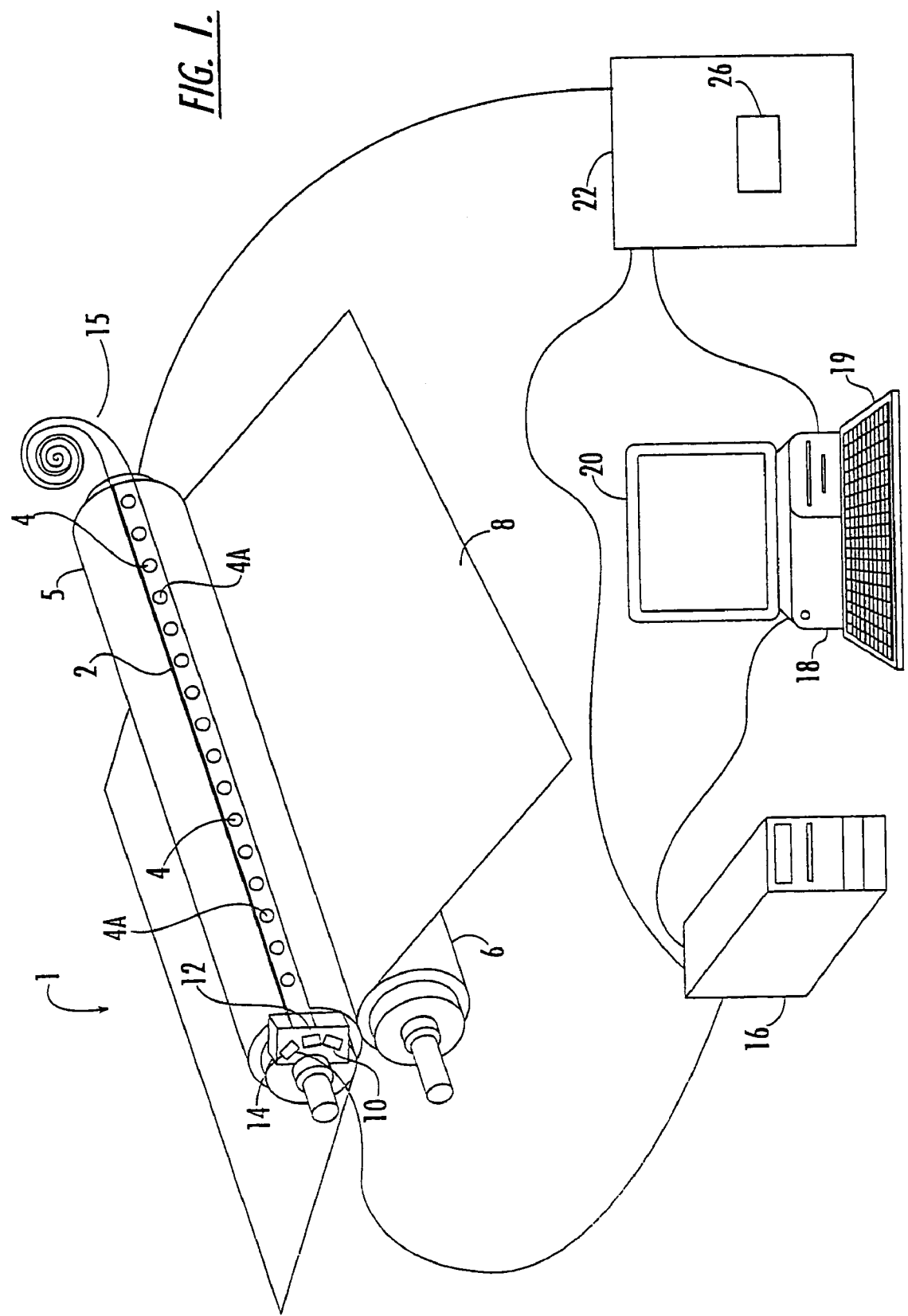
FIG. 1 is a schematic view of a sensing system according to the present invention including a sensing strip, a plurality of sensors according to the present invention being mounted on the sensing strip.
Figure 2:
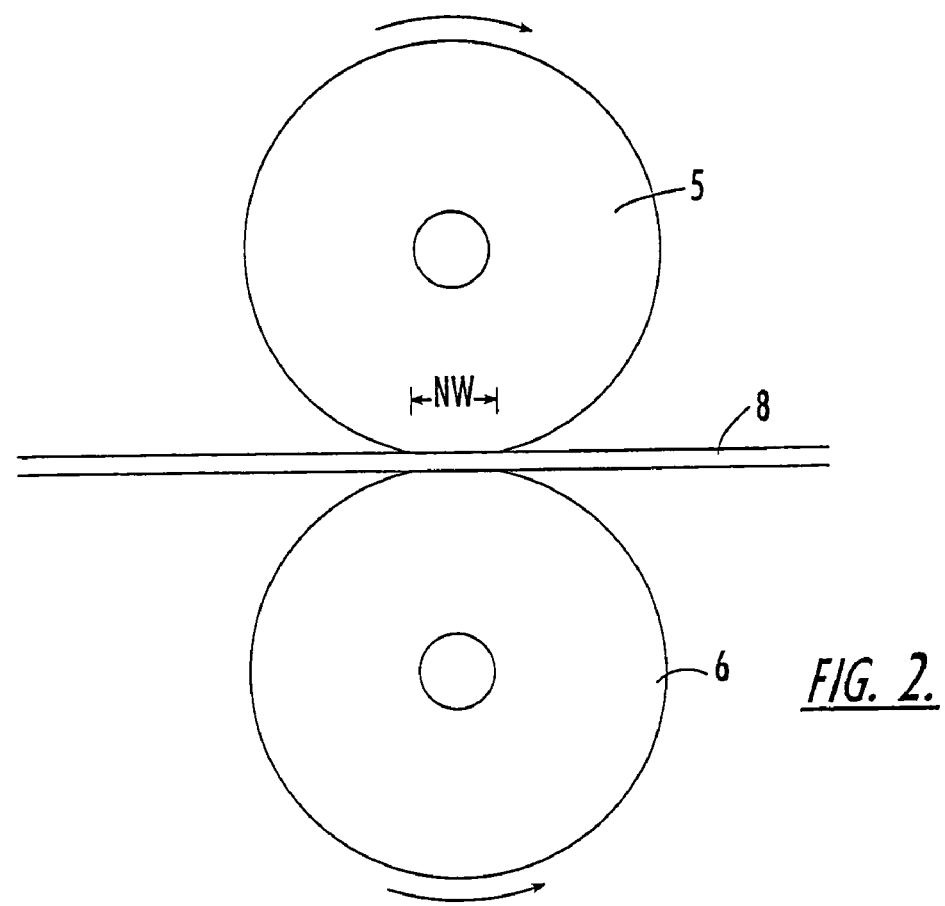
FIG. 2 is an end, schematic view of a press nip and a web nipped between the nip rolls thereof, the nip width of the press nip being designated NW.

FIG. 1 shows a preferred embodiment of the sensing system 1 of the instant invention as it is applied to sense the nip width of, and in certain embodiments the pressure exerted by, rolls 5, 6 in a press nip. As also seen in FIG. 2, in the press nip section of a papermaking machine, the rolls 5 and 6 rotatingly squeeze a fibrous web which is carried on felt 8 disposed therebetween. In order for the rolls 5,6 to provide uniform pressure to a fibrous web, they must be evenly loaded and the width of contact between the rolls, i.e. the nip width, should be within a predetermined range.

Figure 4:
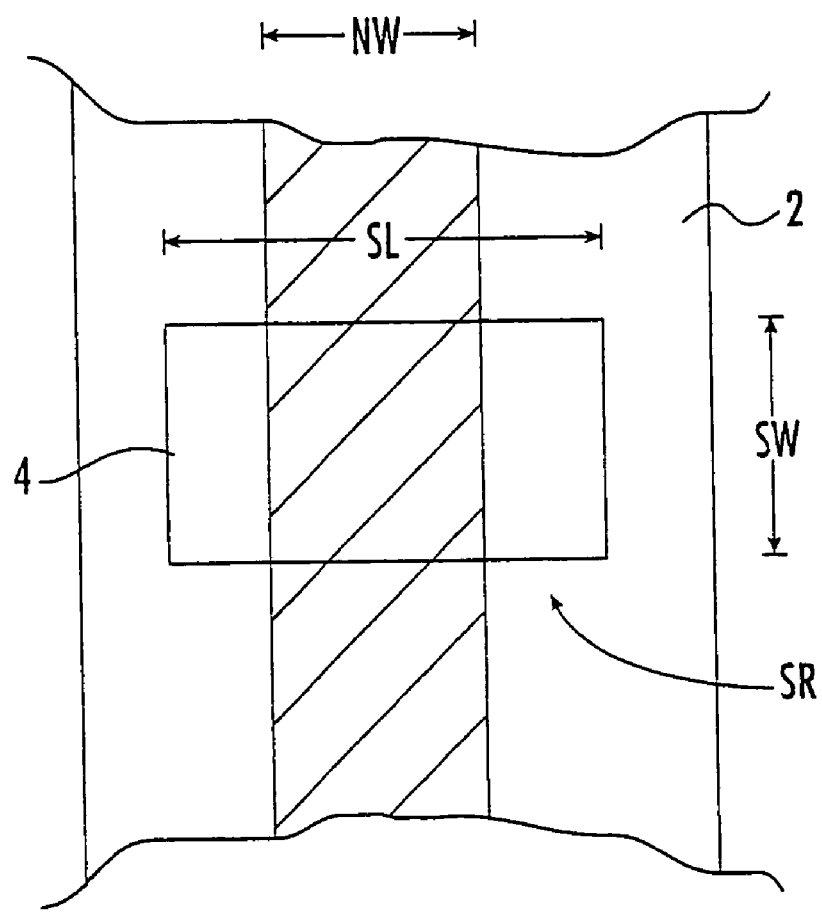
FIG. 4 is a top, schematic, fragmentary view of the sensing strip of FIG. 1 including a sensor mounted on the sensing strip.

The sensing system 1 comprises a strip 2, preferably an elongated member made of a thin film of material. Sensors 4 are fixed to the strip for sensing pressure/force and/or nip width. As discussed in greater detail below, the sensors 4 may be constructed according to different embodiments. Each such sensor embodiment comprises two or more opposed strips or layers and defines a sensing region SR (see FIG. 4), i.e., a region or zone capable of engaging the nip width and responding to such engagement. With reference to FIG. 4, each sensor 4 has a sensing width SW extending parallel to and being shorter than the length of the strip 2. Each sensor 4 has a sensor length SL transverse to the length of the strip 2 and being longer than the greatest anticipated nip width. It will be appreciated that each sensor 4 may have a footprint having length and/or width dimensions greater than those of the sensing region SR.

The strip 2 having the sensors 4 thereon is shown for discussion purposes as not contacting the felt 8 and the roll 6. During system operation, however, the strip 2 must lie in the nip between the roll 5 and the felt 8 or directly between the rolls 5 and 6. Placement of the strip 2 within the nip may be achieved by removably attaching the strip to the roll 5, as shown, and then rotating the roll 5 to properly position the strip. Alternatively, the strip may be placed directly between the rolls 5 and 6 and rolled into the nip by rotating the rolls. One could also open the nip formed by the rolls 5, 6, place the strip between the rolls, and then close the nip.

The strip 2 having the sensors 4 thereon, is preferably rolled into a coil 15 for storage and unrolled during use. The strip may be longer than a roll and the sensors 4 are spaced on the strip so that if a large number of sensors are required to effectively determine pressure distribution or nip width distribution, such as in the case of a long roll, the operator can supply a longer length of the strip 2 (and thereby a larger number of the sensors 4). Any extra, unused length of the strip 2 may extend beyond either or both ends of the rolls. Thus, the sensing system can be used on rolls having different lengths, eliminating the need for different length sensing systems for different rolls and/or mills. Also, several strips of sensors may be pieced end-to-end to span the length of a very long roll.

In order to serve the function of directly measuring or closely approximating the nip widths, the sensors 4 are constructed according to one of several embodiments according to the present invention, each of which are described in greater detail hereinbelow. As discussed below, certain embodiments also serve to measure or relate the nip pressures along the nip.

Also, the system 1 may be equipped with temperature measuring sensors 4A (shown in FIG. 1 only) to aid in temperature compensation if needed. The temperature sensors 4A may be embodied (not shown) in the sensors 4 or positioned alongside respective sensors 4 between each or periodic groups of the sensors 4. The temperature sensors may provide temperature signals which can be used both to compensate for temperature effects on the sensors 4 and to provide a temperature profile across the nip. Suitable temperature sensors include thermocouples and RTDs.

Figure 3:
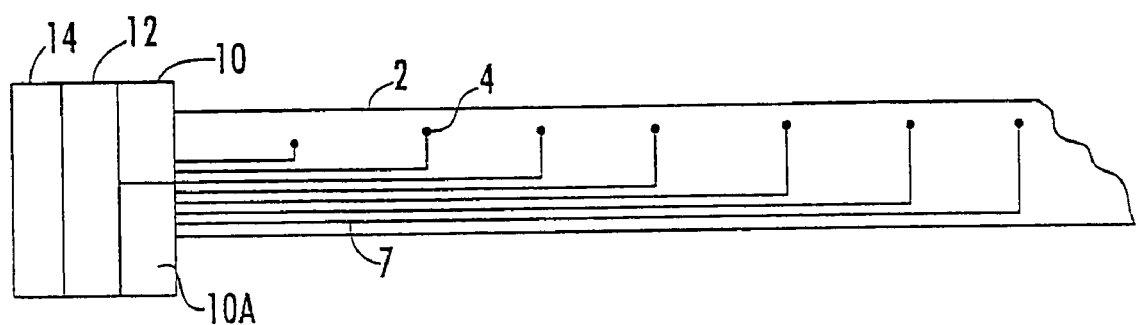
FIG. 3 is a top, schematic, fragmentary view of the sensing strip of FIG. 1.

In communication with the sensors 4 are lead wires 7, as shown schematically in FIG. 3, and associated electronics 10. The relative dimensions of the strip 2, the sensors 4 and the leads 7 will differ from the schematic depiction of FIG. 3, as discussed hereinbelow. Also, each sensor 4 will have at least two leads connected to the electronics 10. The two or more leads may be converged into a single lead 7 or may be mounted individually or in subgroups above and/or below the sensors 4 and routed to the electronics 10.

The electronics 10 connected to the sensors 4 via the leads 7 aid in converting the sensor signal to a signal representative of the nip width or pressure by amplifying the signal and/or eliminating external interference. The electronics 10 include resistance measuring means 10A for determining the electrical resistances across the sensors 4. The resistance measuring means 10A may include a conventional ohmmeter or the like including a voltage source (not shown separately). The means 10A may provide a prescribed voltage across each sensor and measure the sensor resistance by monitoring the current flow through the sensor, or may provide a prescribed current through each sensor and measure the sensor resistance by monitoring the voltage drop across the sensor. Suitable and alternative devices and circuits for serving as the resistance measuring means 10A will be readily apparent to those of ordinary skill in the art upon reading the description of the invention herein. Preferably, the output of the electronics 10 is a voltage signal or a current signal which varies with the measured sensor resistance.

In the discussions which follow regarding sensors according to the several embodiments, reference is made to reading or determining the resistance $R_f$ of the sensors. Because it is the resistance $R_f$ which varies depending on the condition of such a sensor, the devices and methods will be described with reference to measuring the resistance $R_f$ of the sensor except as otherwise noted, it being understood that the resistance $R_f$ is preferably determined by measuring a corresponding voltage or current and/or is converted to a corresponding voltage signal or current signal prior to evaluation.

The electronics 10 are in communication with a multiplexer 12 which is accessed by a bidirectional transmitter 14. The multiplexer 12 cycles through the sensors 4 to obtain signals from sensor locations along the strip 2; and thus along the roll 5, in the press nip. The bidirectional transmitter 14, transmits the signals from the multiplexer 12 to a signal conditioner 16 which, in turn, delivers conditioned signals representing the nip width or pressure sensed to the computer 18. Alternatively (not shown), the relative positions of the electronics 10 and the multiplexer 12 may be reversed.

The sensors and associated electronics are preferably connected directly to the computer via wire cable. A significant benefit of each of the sensors according to the present invention is that they may be used to make nip width and pressure measurements in a static nip. Accordingly, it is not necessary to make special provision for the routing of wires connecting the sensors to the electronics and the electronics to the computer. Nonetheless, the signals may be sent via telemetry or through slip rings. A preferred telemetry transmitter is manufactured by RF Monolithics of Dallas, Tex. This telemetry system provides two-way operation which allows the computer to request profile information as well as to receive the sensor readings. An alternative telemetry system is manufactured by Linx Technologies of Medford, Oreg. This system is low power and has a serial interface.

The computer 18 has a microprocessor having the ability to access the multiplexer 12 at predetermined or requested times to obtain nip width-related or pressure-related data. Requested transmissions are achieved by operator input through the keyboard 19 or mouse of the computer. Once the computer 18 has indicated to the multiplexer 12 which channels to read, the computer 18 receives the signals from the sensors 4 associated with the channels or the leads 7 selectively accessed by the multiplexer.

Such signals are delivered to the microprocessor which runs a software program to compute or correlate a nip width value or pressure value by one or more methods as described below for each type sensor. Preferably, these values are then transmitted to a display 20 which provides numerical or graphical cross machine nip width profiles and/or pressure profiles. The computer 18 can further provide averages of the pressure or nip width values, as well as initiate a correction signal to an optional control system 22.

The control system 22 can be connected to the computer 18 or the signal conditioner 16 to correct any sensed nip width or pressure irregularities by increasing or decreasing the force being applied by the roll, or by increasing or decreasing the degree of contact between the rolls 5, 6. The control system 22 has an internal computer 26 which, upon receipt of such signals, initiates corrective measures to adjust the force being applied by the rolls 5, 6.

Turning now to FIG. 3, the strip 2 preferably has the sensors 4 disposed thereon at spaced locations. The spacing of the sensors is in accordance with the usual practice for crown correction measurements. Although the sensors 4 are shown uniformly and linearly across the roll 5, this configuration is not essential, as the placement of the sensors on the roll can appear in other configurations as well. The leads 7 emanate from each of the sensors and travel to the associated electronics 10 to provide signals representative of the nip width and pressure sensed to the multiplexer 12. As discussed above, these signals are ultimately passed through the bidirectional transmitter 14 where they can be selectively accessed by the computer 18 through the signal conditioner 16.

Figure 5:
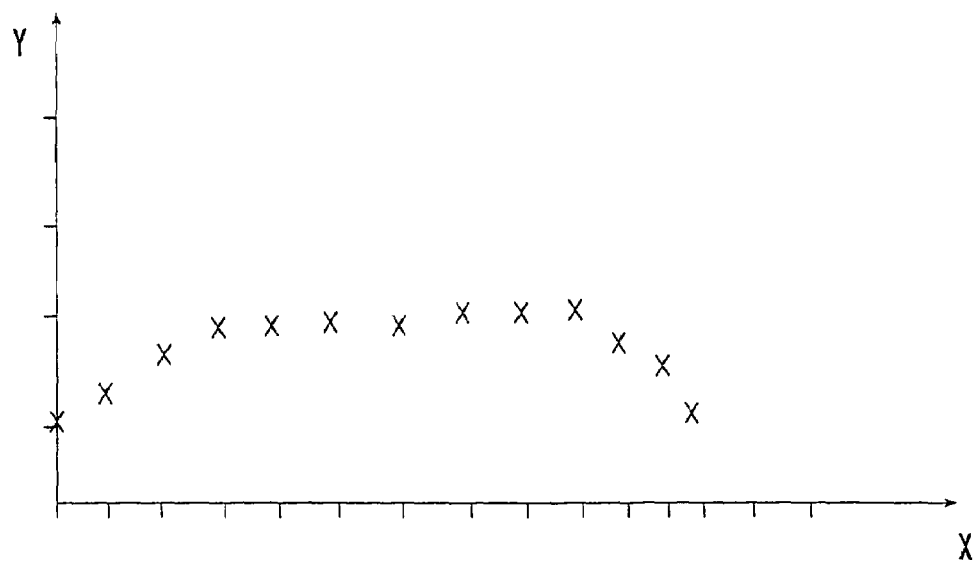
FIG. 5 is a schematic view of a graphical display generated by the sensing system of FIG. 1 showing the pressures measured by the sensors at locations along the sensing strip in the press nip.
Figure 6:
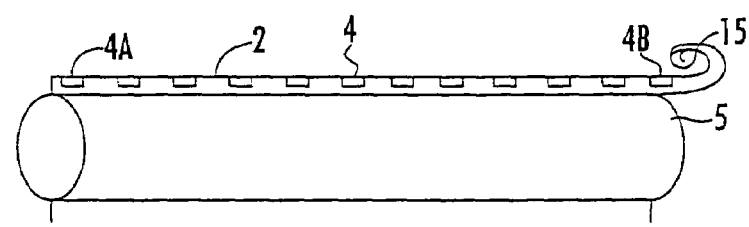
FIG. 6 is a schematic, side view of the sensing strip of FIG. 1 on a roll in the press nip corresponding to the graphical display of FIG. 5.

Certain of the sensors described below provide a signal corresponding to the pressure between the rolls at the sensor location. Turning now to FIG. 5, a graphical representation is shown of the pressure sensed by such sensors along the length of the roll depicted in FIG. 6 in terms of sensor location on the strip, set forth on the x-axis, versus pressure sensed, set forth on the y-axis. Referring to FIG. 6, the pressure sensed by the sensor 4B on the strip represents the pressure at the end of the roll 5. The sensor 4B may, however, not be the last sensor on the strip 2 due to the possibility of having an unused, coiled portion of the strip.

Figure 7:
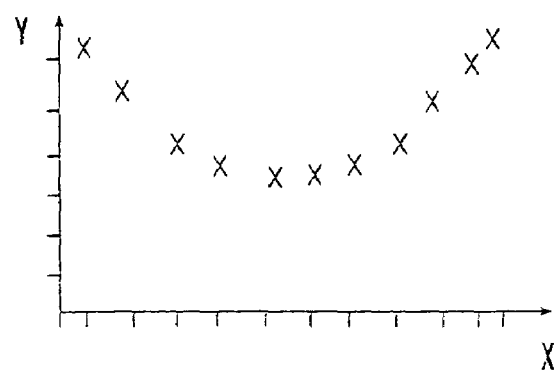
FIG. 7 is a schematic view of a graphical display generated by the sensing system of claim 1 showing the nip widths measured by the sensors at locations along the sensing strip in the press nip.
Figure 8:
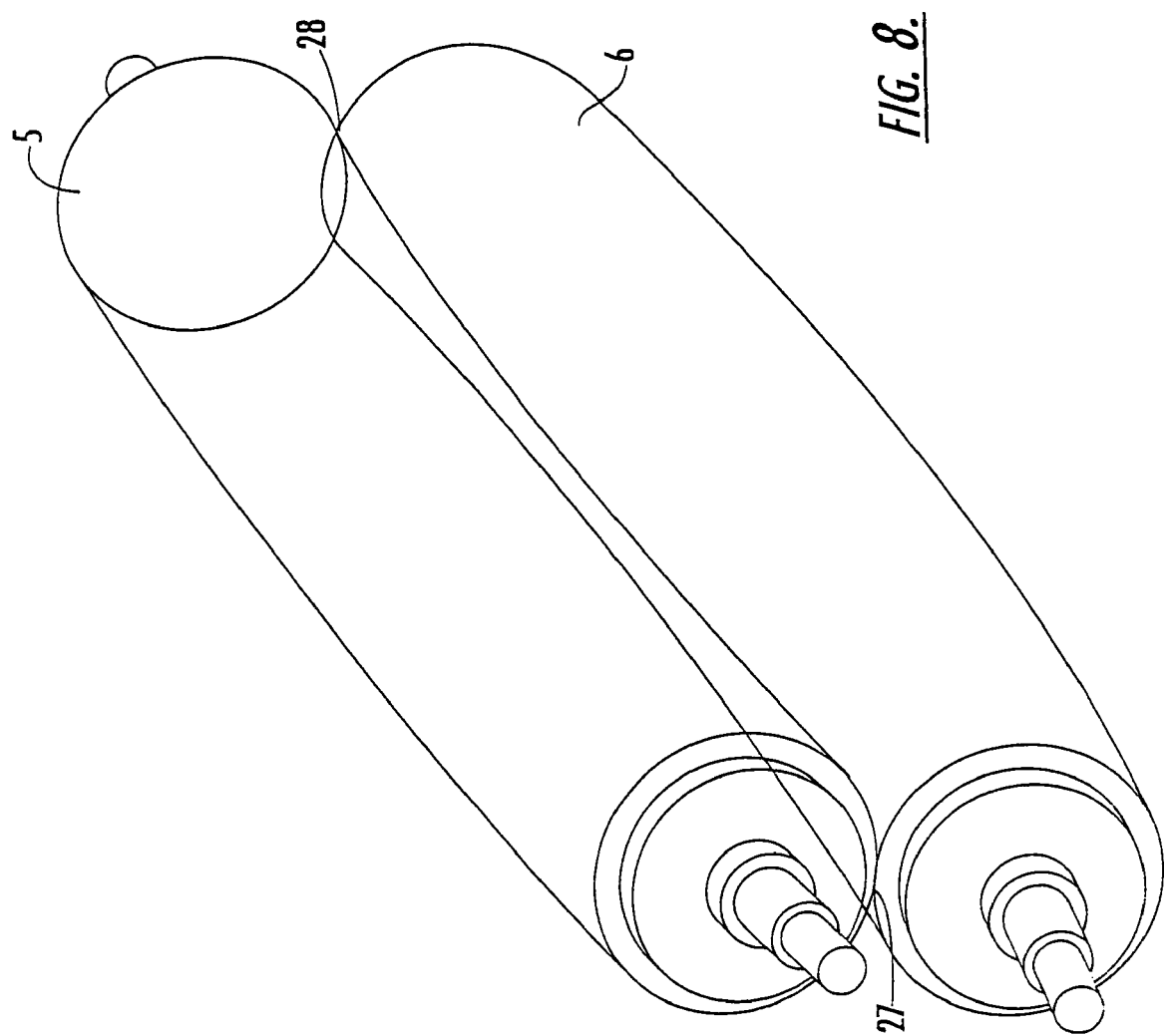
FIG. 8 is a schematic view of a press nip corresponding to the graphical display of FIG. 7.

FIG. 7 provides a graphical representation of the nip width distribution for the rolls 5, 6 of FIG. 8. This representation may be constructed using any of the sensors described hereinbelow. As can be seen, the ends 27, 28 of the rolls are loaded more heavily than the center and the corresponding nip widths are greater on the ends. This loading distribution is commonly called "undercrowned", indicating that the crown is too small for the journal loading. A uniform nip width distribution/pressure profile may be achieved by increasing the crown or by decreasing the journal loads.

The general operation of the invention is as follows. One may approach the test in many ways. One way would be to unload the rolls in contact. The sensor strip 2 is placed between the two rolls, leaving the unused portion in a coiled configuration at the end of the roll 5 or extending beyond each end of the roll 5. The roll 6 is then loaded against the roll 5, which has the strip 2 thereon. After the rolls are loaded to the prescribed journal forces, usually measured by air bag pressures, the sensor strip 2 readings are acquired, as discussed above.

Another approach to test the nip pressure profile would be to load the rolls at the prescribed journal forces, and then feed the sensor strip through the nip. The placement of the strip 2 may be achieved through a robotic arm or other automated equipment currently available. In addition, the strip 2 could be attached lengthwise to one of the rolls, or could be carried by the felt or web. The sensor readings may be acquired as the sensor passes through the nip. Preferably, however, the sensors are positioned between the rolls to span the nip width and the measurements are made with the press nip in a static condition. Notably, each of the sensor embodiments described hereinafter allow for measurements in a static press nip.

In either method, at a predetermined or operator-requested time, the computer 10 communicates with the bidirectional transmitter 14, which further communicates with the multiplexer 12. The multiplexer 12 then cycles through the sensors 4, obtaining signals through the associated electronics 10, which signals are indicative of the nip width (and, in the case of some sensors, the pressure) being sensed by the sensors 4. The multiplexer 12 then communicates with the transmitter 14 to send the signals to the signal conditioner 16 for delivery back to the computer 18 where the determination of the nip width values (and the pressure values) takes place.

The computer 18 then causes a numeric or graphical output to appear on the display 20, alerting the operator of the nip width or pressure distribution in the press. Optionally, the computer 18 and/or the transmitter 14 can communicate pressure-related or nip width-related signals to the control system 22. In response to such signals, the control system 22 can then initiate crown correction to remedy any irregularities in the nip width or pressure sensed.

The system of the instant invention provides the operator with the ability to determine the nip width and pressure profile of a roll in one or more nips so as to diagnose the presence of unevenly applied roll forces. The various graphical representations enable the operator to immediately determine the nip width, the pressure being applied, the location on the strip (indicative of the location along the length of the roll), and whether or not the nip width and pressure are abnormal. Additionally, the system of the instant invention provides for corrective measures to be initiated in response to such inappropriate nip widths and unevenly applied forces.

Figure 9:
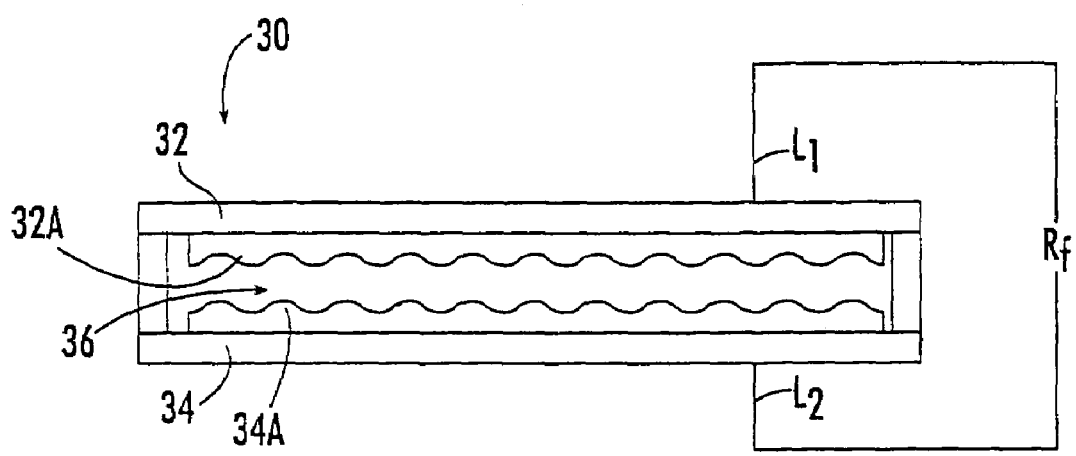
FIG. 9 is a side, schematic view of a large pad force sensitive resistor sensor according to one embodiment of the present invention for use in the sensing system of FIG. 1, the sensor shown in an open, non-nipped position.
Figure 10:
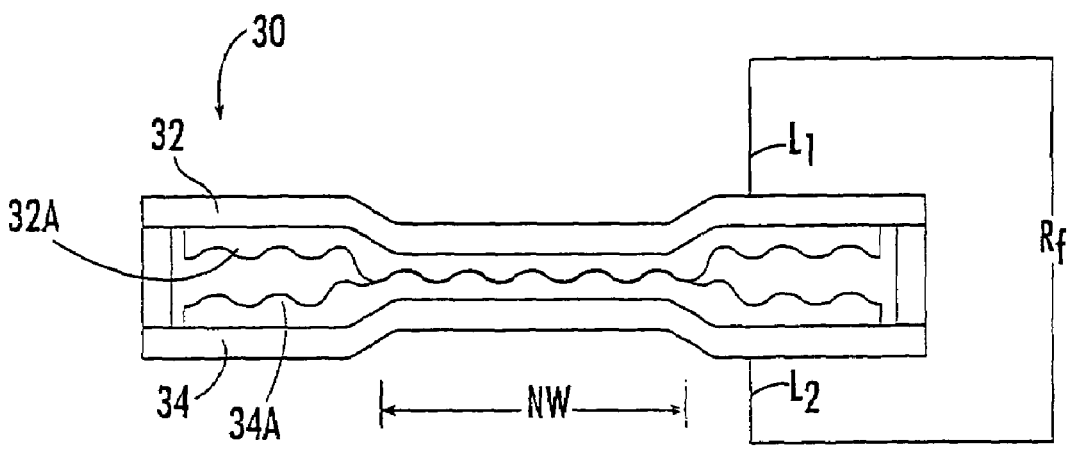
FIG. 10 is a side, schematic view of the sensor of FIG. 9 shown in a closed, nipped position.

With reference to FIGS. 9 and 10, a sensor 30 according to a first embodiment is shown therein. Sensors 30 of this construction may be used in the sensing system 1 as the sensors 4. The sensor 30 is what is commonly referred to as a force sensitive resistor sensor or FSR sensor. The sensor 30 includes spaced apart electrically conductive, flexible, resilient strips 32 and 34 which may be formed of silver or like material. Lead lines $L_1$ and $L_2$ are connected to the strips 32 and 34, respectively, and to the resistance measuring means. The strips 32 and 34 have layers 32A and 34A of resistive material secured to their opposed faces. The opposed faces of the layers 32A and 34A are separated by an air gap 36 and have substantially complementary, rugged profiles. Examples of suitable FSR sensors include UNIFORCE™ sensors available from Force Imaging Technologies, Inc. of Chicago, Ill.

The sensor 30 has an effective sensor length SL which is greater than the longest anticipated nip width to be measured. For example, if for a given press nip it is customary for the nip width to range from 0 to 3.5 inches, then the sensor length SL should be at least about 7 inches to allow for some misalignment of the strip when installed. The effective sensor width SW (see FIG. 4) should be matched to the surface topography of the rolls. For grooved rolls, the sensor width SW should be an integral multiple of the groove spacing. For drilled covers, the sensor width SW should correspond to one repeating unit of the drill pattern. For plain covers, the sensor width SW should be wide enough to provide a good average, preferably about 0.25 inch. Each of the sensors described below should have effective sensing width and length dimensions as just described. It will be appreciated that the overall dimensions of the sensor units may be greater as they may include various cladding and mounting elements, for example.

The sensor 30 is biased such that, prior to placement of the sensor 30 into the press nip, the sensor will assume an open position as shown in FIG. 9. The sensor resistance $R_f$ between the leads $L_1$ and $L_2$ as measured by the resistance measuring means 10A will be nearly infinite because the gap 36 prevents substantially all of the current flow between the strips 32 and 34. When the sensor 30 is installed in the nip, the portions of the strips 32, 34 in the nip width NW are forced toward one another. The length of the nip width will determine the contact area between the resistive layers 32A, 34A and the nip pressure will determine the force under which the resistive layers are engaged. As is well known in the art, the resistance $R_f$ of the FSR sensor 30 will depend on both the area of contact and the amount of pressure. For greater amounts of contact and pressure, the resistance $R_f$ will be lower. The resistive material 32A, 34A is chosen to have a relatively high saturation value as compared to the expected combination of nip width and nip pressure. That is, for the highest expected nip width and nip pressure, the FSR sensor 30 should not saturate, that is, achieve its minimum possible resistance value.

It will be appreciated that the nip width NW cannot be readily determined from the measured resistance $R_f$. A given resistance $R_f$ value may correspond to both a relatively long nip width paired with a relatively low pressure or, alternatively, a relatively short nip width paired with a relatively high nip pressure. Thus, while the simple large pad FSR sensor 30 is relatively inexpensive to make and use and is convenient to install, it does not provide a direct measure of the nip width, the nip width value being needed for common crown correction calculations.

Figure 36:
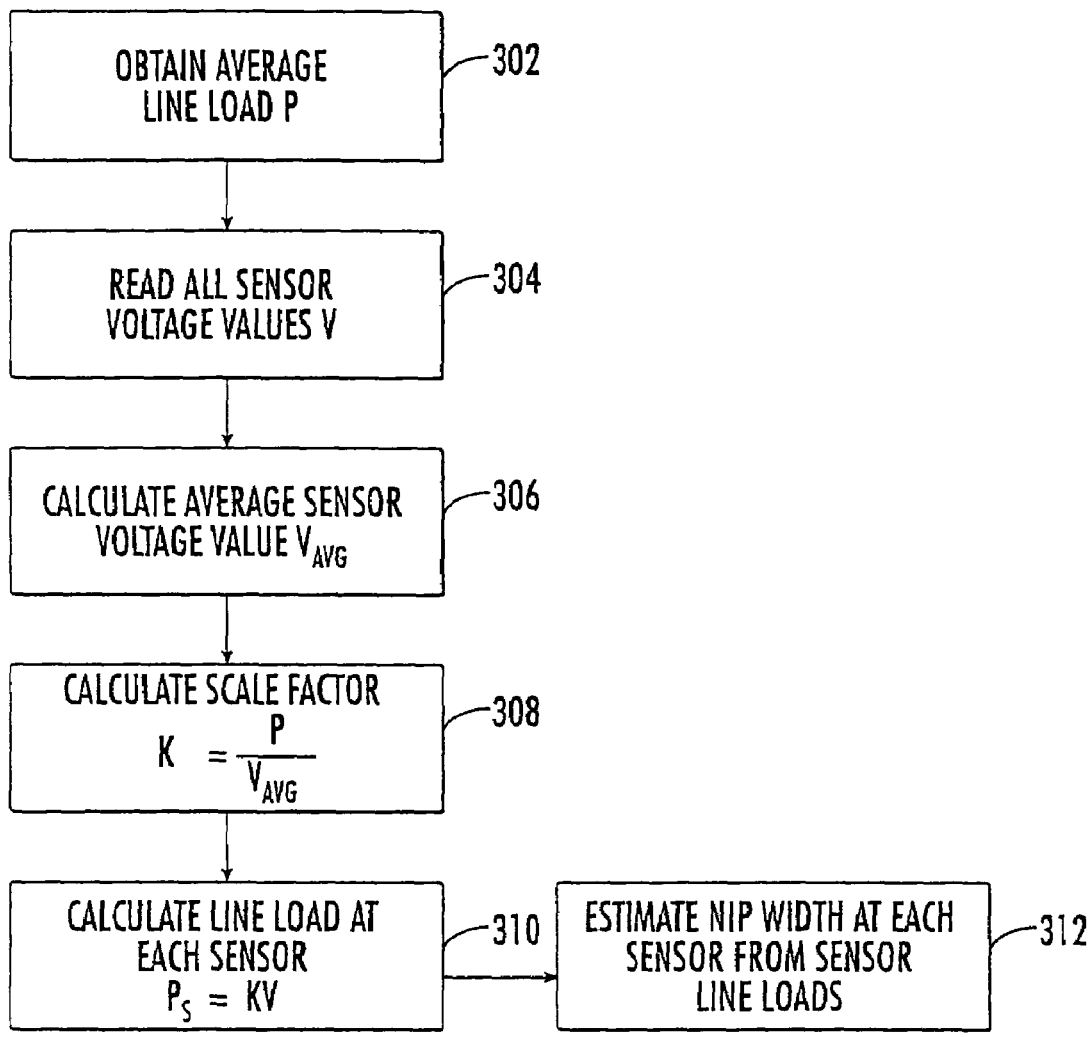
FIG. 36 is a flowchart representing a method for estimating a nip width.

In view of the foregoing and with reference to FIG. 36, the following method according to the present invention may be employed to closely approximate the nip width based on the resistance value $R_f$ of each FSR sensor 30 on the strip 2 having a plurality of sensors 30 spaced thereacross. Preferably, the condition of each sensor is converted by the resistance measuring means 10A from a resistance $R_f$ value to a voltage signal V and provided to the signal conditioner 16 as a voltage signal. The resistance $R_f$ of the sensor may be converted to the corresponding voltage signal V using a feedback gain resistor (not shown) of known value $R_G$ and a prescribed excitation voltage $V_{EX}$, where $V=(R_G/R_f)*V_{EX}$. This circuit serves to linearize the signal so that the output voltage is proportional to the force for a given area. Alternatively, the current through the sensor may be measured, such current being proportional to the resistance $R_f$ of the sensor.

In accordance with the method, the actual tested average "base load" or "line load" P is determined (Block 302). The average line load P (typically expressed in pounds/inch or Newtons/meter) is the total force (typically expressed in pounds or Newtons) applied to the rolls of the nip divided by the length of the roll 5. The actual average line load P may be determined by reading the gauges on the operator panel and, in some cases, converting the gauge pressure to line load by reference to a chart. Methods and means for determining an actual average line load are known to those of skill in the art.

A reading of the voltage V (which, as discussed above, corresponds to the resistance $R_f$) is taken from each sensor along the roll (Block 304). An average sensor voltage value $V_{AVG}$ is calculated (Block 306). The average sensor voltage value $V_{AVG}$ may be calculated by any suitable method. A scale factor K is then calculated, where K equals the average line load P divided by the average sensor voltage value $V_{AVG}$ (Block 308). Each measured sensor voltage value V is then multiplied by the scale factor K to calculate a sensor line load value $P_S$ for that sensor (Block 310). In this way, a local line load value (pounds or Newtons) $P_S$ is approximated for each sensor. The local line load value $P_S$ corresponds to the total force applied to the respective sensor divided by the sensor width SW.

Next, for each sensor, the approximated local line load value $P_S$ is used to estimate the actual nip width (inches or meters) using a suitable method wherein the nip width is determined as a function of the approximated local line load (i.e., nip width NW=function (line load $P_s$)) (Block 312). Suitable methods include empirical equations (e.g., TAPPI TIS 0420-02 (1988)), theoretical equations (e.g., a Hertzian Equation), a finite element evaluation, a theoretically derived reference chart, or an empirically derived reference chart. Preferably, the chosen method will account for different roll hardnesses and diameters.

In addition to use in approximating the nip widths for crown corrections, the approximated load values may be used to identify the location of the peak load and the relative load distribution along the length of the roll.

Figure 37:
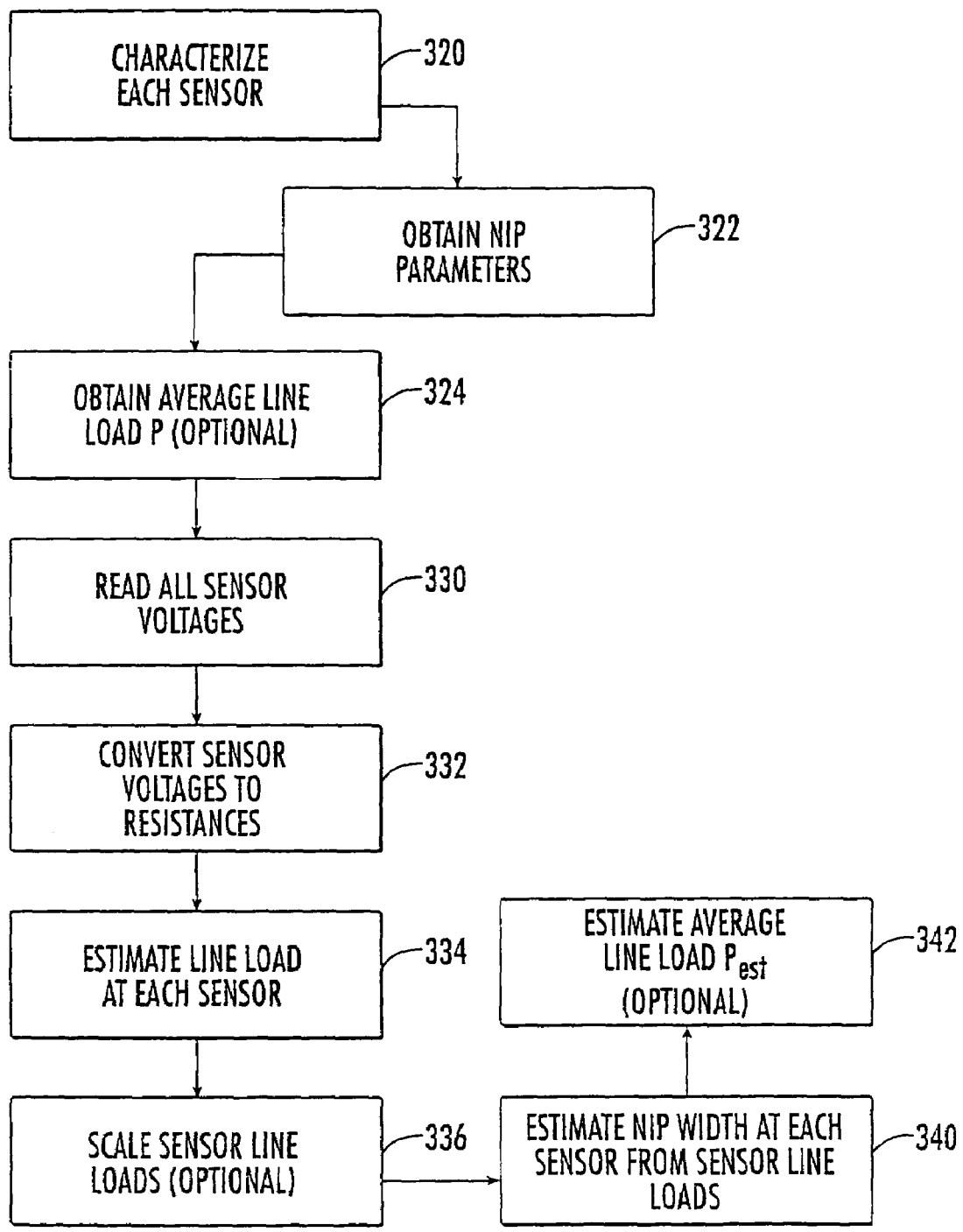
FIG. 37 is a flowchart representing a method for estimating a nip width.

With reference to FIG. 37, the nip width may also be closely approximated by means of the sensors 30 using the following alternative method. It will be appreciated that the order of the steps as described below may be rearranged.

Prior to use in measuring a nip width of a press nip, each sensor 30 is characterized to determine the effect that applied pressure and contact area have on the sensor resistance (Block 320). This relationship may be represented by an equation, a set of equations, or a table of resistance values for given pressures over a given contact area. Preferably, the sensor behaviors are characterized according to the following equation:

$$R_f = \frac{1}{\frac{A_0}{l\rho_0} + \int \frac{dA}{l\rho_p}}$$

where
  $R_f$ is the sensor resistance,
  A is the loaded area,
  $A_0$ is the area of the unloaded region of the sensor,
  l is the thickness of the resistive layers in the sensor,
  $\rho_0$ is the unloaded resistivity, and
  $\rho_p$ is the loaded resistivity which is a function of applied pressure and can also vary with the loaded area A.

To evaluate the relationship between $\rho_p$ and pressure, the characterization tests may be performed using a constant contact area, whereupon the foregoing equation may be reduced to:

$$R_f = \frac{1}{\frac{A_0}{l\rho_0} + \frac{A_p}{l\rho_p(\sigma)}}$$

where $A_p$ is the area of the loaded region of the sensor and $\sigma$ is the applied pressure level.

To test the sensors, the resistance of each sensor is measured while the entire sensor is unloaded, in which case:

$$l\rho_0 = R_{f0} A_O$$

where $R_{f0}$ is the sensor resistance when unloaded.

The resistance of each sensor is then measured while the sensor is loaded at several pressure levels using a constant contact area. From these measurements, the relationship between $l\rho_p$ and pressure is determined. An equation may be curve fit to the measurements. It may be assumed that the resistivity is inversely proportional to applied stress or a general curve fit may be applied. From these equations, the sensor resistance may be predicted for any applied pressure distribution.

Next, various parameters of the press nip being tested (i.e., to determine the nip width thereof) are assessed (Block 322). Preferably, all or some of the following characteristics are determined:
  covered roll construction and mating roll construction, including:
    outside diameter,
    hardness,
    working rubber thickness,
    cover thickness,
    actual material for each layer of the cover,
    the diameter of the metal roll that the cover is placed on, and
    surface machining (such as drilled holes, grooves, and combinations);
  number and type of press fabrics in the nip; and
  roll temperatures, if the rolls are warm during the test.

Optionally, a measured press nip average line load value P may be obtained from conventional papermaking machine gauges during the test or obtained by converting pressure gauge readings to an average line load value based on a chart typically provided by the machine manufacturer (Block 324). This average line load value P may be used subsequently to scale certain measurements.

Next, the electronics scan through each of the sensors to measure the voltage V of each sensor (Block 330). Each sensor voltage V is converted to a sensor resistance $R_f$ using the equation (Block 332):

$$R_f = R_g \frac{V_{ex}}{V}$$

where
- $R_f$ is the sensor resistance,
- $R_g$ is the electronics feedback gain resistor resistance,
- $V_{ex}$ is the excitation voltage, and
- V is the sensor voltage The equation may be modified depending on the electronics employed.

Next, for each sensor, the local line load $P_s$ at each sensor is calculated (Block 334) using the respective sensor resistance as measured and calculated (i.e., sensor local line load $P_s$=function (sensor resistance $R_f$)). This may be accomplished using several alternative methods.

One way to estimate the line load $P_s$ at a sensor given a resistance reading is to solve for the line load required to achieve a certain sensor resistance in the following manner. When two rolls having given parameters are loaded together at a load $P_t$, there is a certain pressure distribution within the nip. This distribution may be measured experimentally or estimated using empirical equations, theoretical analyses, or finite element analyses. That is, for given roll parameters, the relationship between line load and pressure profile can be determined. Generally, for greater line loads, the nip width will be greater.

First, an estimated line load $P_t$ is chosen. The pressure distribution corresponding to this load $P_t$ for rolls having these parameters (as determined by experiment, empirical equations, theoretical analyses, or finite element analyses) is identified. The identified pressure distribution is used to calculate a corresponding sensor resistance $R_t$ in accordance with the earlier characterization of the sensor resistance as a function of applied pressure and contact area. Preferably, this calculation is made by inputting the identified pressure distribution into the first $R_f$ equation discussed above with regard to Block 320.

If the theoretical sensor resistance $R_t$ thus calculated is higher than the measured sensor resistance $R_f$, then a higher estimated line load $P_t$ is selected and $R_t$ is recalculated until $R_t$ equals the measured sensor resistance $R_f$. Similarly, if $R_t$ is less than resistance $R_f$, then a lower estimated line load $P_t$ is selected and $R_t$ is recalculated until $R_t$ equals the measured sensor resistance $R_f$. In this way, an estimated sensor local line load $P_s$ is derived for each sensor using (1) the measured sensor resistance $R_f$, (2) the known relationship between line load, applied pressure and contact area for the rolls, and (3) the characterization of the sensor resistance as a function of applied pressure and contact area.

A more direct approach to mapping resistances to loads is to pre-calculate the resistance values for rolls having given parameters for a set of loads within an anticipated range. A table of resistances versus line load is given for a measured sensor resistance value $R_f$. The corresponding line load value $P_s$ is determined by interpolating the table.

Alternatively, the resistance values $R_f$ may be pre-calculated for a set of loads. From this data, an equation may be fit that calculates line load $P_s$ as a function of sensor resistance $R_f$. This equation is then used instead of referencing a table or conducting more extensive analyses.

Because the above line load distribution may over-predict or under-predict the line load average obtained in the step of Block 334, it may be desirable to scale the line load values $P_s$ (Block 336) by multiplying each line load value $P_s$ from the foregoing step (Block 334) by a constant scaling factor k to make the average of the sensor local line load values equal to the measured average line load value P. The scaling factor k may be calculated as follows:

$$k = \frac{nP}{\sum_{s=1}^{n} P_s}$$

where n is the number of sensors in the nip.

An alternative approach is to equate the integrated total force between the nipped rolls as follows:

$$k = \frac{(n-1)P}{\frac{1}{2}P_1 + \sum_{s=2}^{n-1} P_s + \frac{1}{2}P_n}$$

This relationship assumes equally spaced sensors, and may be modified as necessary to accommodate non-equal spacing. Other integration techniques may be used as well. In this manner, an adjusted or scaled line load value $kP_s$ is calculated for each sensor (k equals 1.0 if this optional scaling step is omitted.).

Next, the nip width NW at each sensor location is determined using the calculated sensor line load $kP_s$ at the respective sensor (Block 340). As discussed above, the relationship between line load and pressure distribution (namely, applied pressure and contact area) may be determined for a given set of rolls experimentally or estimated using empirical equations, theoretical analyses or finite element analyses. The pressure distribution and, in particular, the contact area, corresponding to the calculated sensor line load $kP_s$ is determined in this manner. Because the nip extends fully across the sensor width, the nip width NW can be readily derived from the determined contact area.

Additionally, where the operator wishes to determine the average line load and it is not known from other sources the average line load may be estimated as follows (Block 342):

$$P_{est} = \frac{\frac{1}{2}P_1 + \sum_{s=2}^{n-1} P_s + \frac{1}{2}P_n}{n-1}$$

where $P_{est}$ is the estimated average line load and n is the number of sensors. The above equation assumes equally spaced sensors. Other methods may be used. For example, an average of the sensor readings may be calculated as follows:

$$P_{est} = \sum_{s=1}^{n} \frac{P_s}{n}$$

This step is optional and is not necessary to estimate the nip widths.

Figure 38:
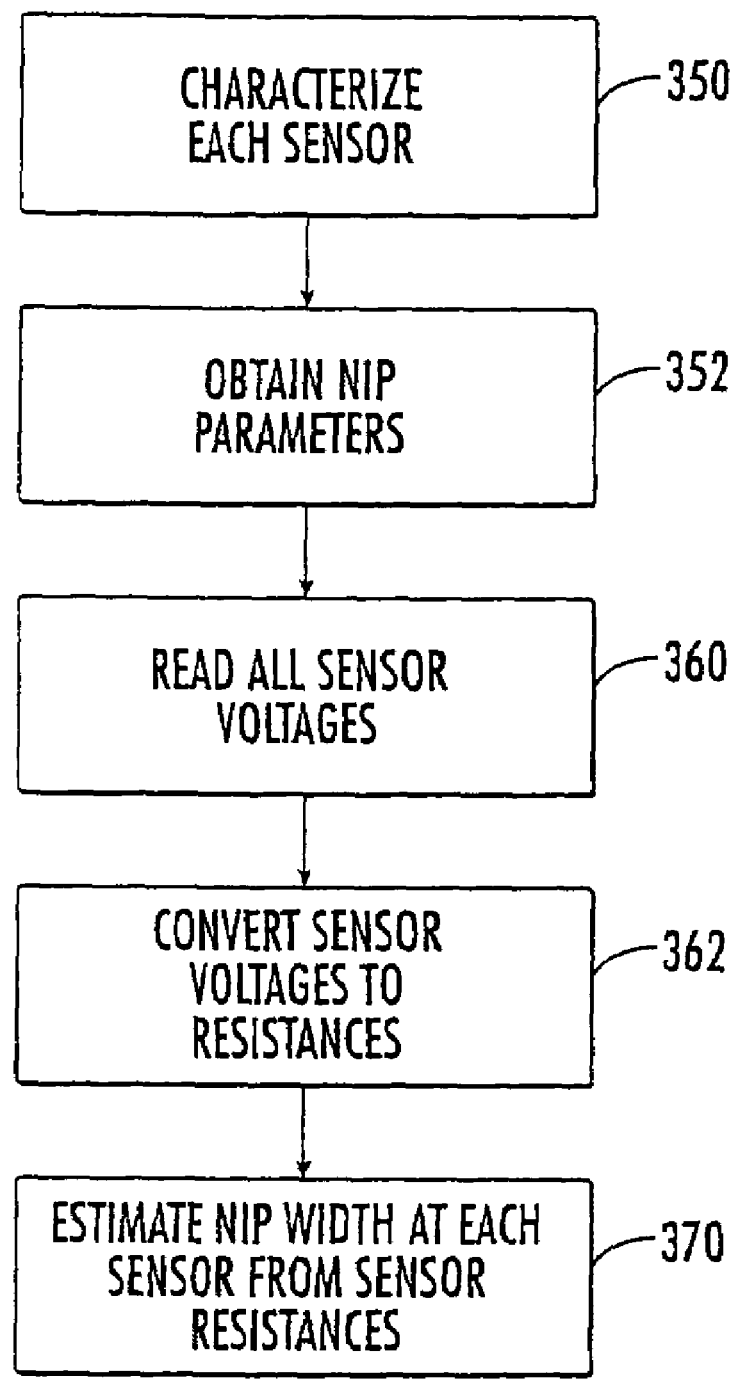
FIG. 38 is a flowchart representing a method for estimating a nip width.

With reference to FIG. 38, the nip widths may also be closely approximated by means of the sensors 30 using the following alternative method. The sensors are characterized (Block 350), nip parameters are obtained (Block 352), the sensor voltages are read (Block 360), and the sensor voltages are converted to resistances (Block 362) in the same manner as described above with respect to the steps of Blocks 320, 322, 330, and 332, respectively, of FIG. 37.

Experimental data, empirical equations, theoretical equations or finite element analyses is used in the manner described above in conjunction with data from the foregoing sensor characterization step to map nip width for each sensor to resistance (i.e., nip width NW=function($R_f$)). The nip width at each sensor may be estimated by reference to a chart or equation for a nip press having the appropriate characteristics which correlates the calculated sensor resistance $R_f$ to the corresponding nip width expected in a nip press having the assessed parameters. Notably, because the nip width NW is determined without first determining a sensor line load $P_s$ corresponding to the sensor resistance $R_f$, the nip width calculation cannot be scaled in view of a measured average line load P.

Optionally, a nip width or pressure at a chosen sensor 30 may be measured by other means, for example, a Prescale film, a carbon paper or an embossed foil. The nip width or pressures from the reference (e.g., chart, empirical equation, theoretical equation, finite element evaluation or the like) are then scaled by multiplying each reference nip width or pressure by a factor appropriate to make the chart nip width or pressure of the chosen sensor equal to the nip width or pressure determined by the other means. As an alternative to scaling the reference nip width or pressure, the nip width or pressure measured by the other means may be used to select the appropriate reference chart or equation. That is, for a given sensor resistance $R_f$ and a given measured nip width or pressure (e, by a Prescale film), a chart or equation is selected in which the resistance $R_f$ corresponds to the measured nip width or pressure, different charts and equations being provided for different roll characteristics. The nip width NW for each sensor is then determined using the measured resistance $R_f$ and the new reference chart or equation. Alternatively, it may be determined that the reference nip width or pressure is more accurate than that measured by the other means, in which case the measurements of the other means may be disregarded.

The foregoing sensor 30 employing pressure sensitive material provides signals which are functions of both contact pressure and contact area. As a result, this sensor provides signals representative of a combination of nip width and pressure. It is necessary to scale and convert the signals to derive an empirically or theoretically determined approximation of the nip width. Because crown corrections are made from nip width measurements, a means for measuring nip width directly is desirable. That is, it is desirable to construct the sensors 4 such that they are able to sense nip width independently of contact force so that the nip width signal (i.e., the sensor signal from which the nip width is determined) is not affected by variations in the nip pressure.

Figure 11:
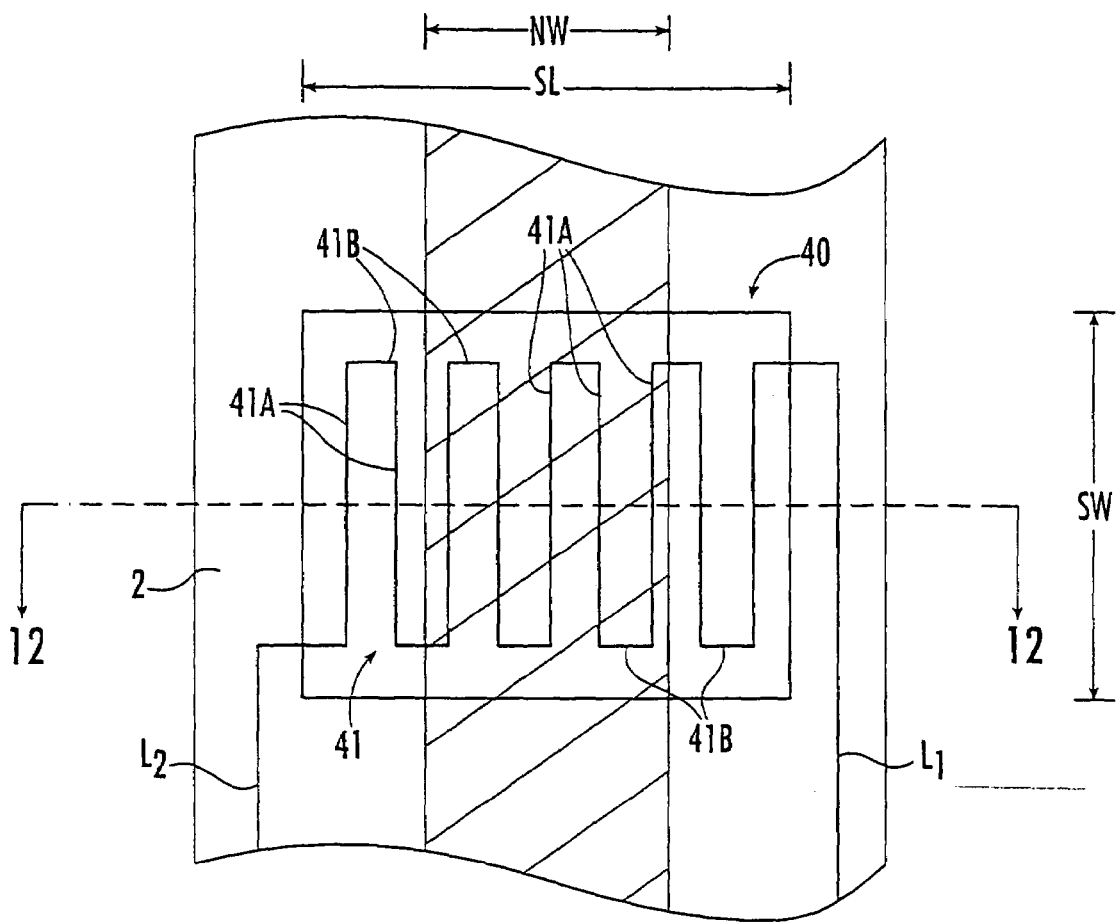
FIG. 11 is a top, schematic view of the sensing strip including a force sensitive resistive trace pattern sensor according to a further embodiment the present invention.
Figure 12:
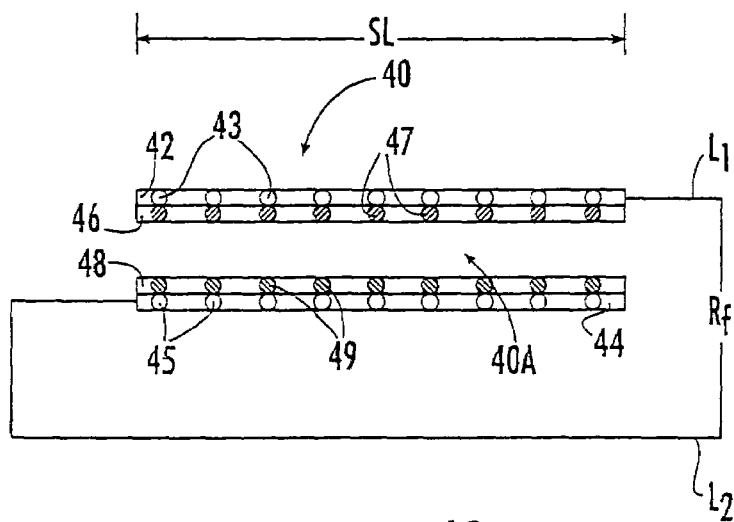
FIG. 12 is a side schematic view of the sensor of FIG. 11.

Referring now to FIGS. 11 and 12, a sensor 40 according to a second embodiment is shown therein mounted on the strip 2 (see FIG. 11) as one of the sensors 4. The sensor 40 has an effective sensing length SL extending from the leftmost to the rightmost vertical line 41A and an effective sensing width SW extending from the topmost to the lowermost horizontal line 41B. Preferably, the sensor length SL is the same as described with respect to the sensor 30 and the sensor width is greater than the width of any grooves or drill holes in the roll. As in the case of the sensor 30, the sensor 40 employs a force sensitive resistive material. However, in the sensor 40, the force sensitive material is provided in a prescribed, discrete configuration which serves to minimize the effect of variations in nip pressure magnitude, thereby providing a more direct and accurate approximation of the nip width NW.

FIG. 11 schematically depicts the sensor 40 disposed on the strip 2 and spanning the nip width NW. FIG. 12 is a schematic, cross-sectional view of the sensor 40 taken along line 12—12 of FIG. 11. As shown in FIG. 12, the sensor 40 includes film layers 42 and 44. Each of the film layers 42 and 44 is flexible and resilient. Preferably, each of the layers is formed of polyester. Ink traces 43 and 45 are printed directly onto the opposed surfaces of film layers 42 and 44, respectively. Ink traces 47 and 49 are in turn printed directly onto ink traces 43 and 45, respectively. Each ink trace has a configuration as represented by the continuous line pattern 41 in FIG. 11, the pattern 41 including vertical lines 41A joined by horizontal lines 41B. Accordingly, the ink traces are coextensive. The sensor 40 is biased such that an air gap 40A separates the layers 42 and 44 as well as the ink traces 47 and 49 from one another when the sensor 40 is not under the nip load. As will be appreciated by the skilled artisan, this construction allows, in this embodiment and in the other embodiments described below using plural film layers and respective ink traces, for relatively small spacing between adjacent sensing lines and, therefore, improved resolution.

The ink traces 43 and 45 are formed entirely of a highly conductive material such as silver. The ink trace 43 is connected to the lead line $L_1$ and the ink trace 45 is connected to the lead line $L_2$. The lead lines $L_1$ and $L_2$ are connected to the positive and ground poles of a voltage source.

Portions or all of the ink traces 47, 49 are formed of force sensitive material having a low saturation value compared to the expected minimum pressure in the nip width. By low saturation value it is meant that, when subjected to a prescribed nominal pressure, preferably less than the lowest expected pressure in the nip width, the loaded force sensitive resistor line should saturate and achieve its minimum possible resistance. Preferably the prescribed nominal pressure is about 5% of the highest pressure (i.e., peak pressure) which is expected to be experienced anywhere within the nip width. Alternatively, the prescribed nominal pressure may be a fixed amount, preferably about 5 psi or less. The force sensitive material is preferably a known pressure sensitive ink, such as one containing molybdenum disulfide.

According to one embodiment, the ink traces 47 and 49 may be formed entirely of force sensitive resistive material having a low saturation value relative to the anticipated nip load. In this case the lengths of the vertical lines of resistive material should be at least 10 times as great as the lengths of the horizontal lines. According to an alternative embodiment, the vertical lines of the ink traces 47, 49 may be formed of force sensitive resistive material having a low saturation value relative to the anticipated nip load with the horizontal lines being formed of electrically nonconductive material.

Prior to placement of the sensor 40 into the nip, the resistance $R_f$ between the lead lines $L_1$ and $L_2$ as measured by the resistance measuring means 10A is infinite due to the air gap 40A. When the sensor is placed across the nip width, the film layers are forced together by the rolls, and those portions of ink traces 47 and 49 within the nip width are forced into contact with one another. Because the resistive material has a relatively low saturation value, each of the mating portions of the ink traces 47, 49 provide their lowest possible resistances. Also, assuming the sensor 40 is suitably aligned relative to the roll length, each vertical line 41A which is at all within the nip width will be entirely in the nip width. Hence, each vertical trace line 41A will act as an on/off switch, dependent on whether it is within or outside of the nip width NW, so that the resistance $R_f$ of the sensor 40 will correspond to the nip width. The sensor resistance values $R_f$ for different nip widths (i.e., different numbers of lines under pressure) can be determined experimentally or theoretically and correlated to corresponding nip width values in a calibration chart or table.

It will be appreciated that in the case where the horizontal lines of the ink traces 47, 49 are also formed of resistive material, the calibration chart must account for the reduction in the sensor resistance $R_f$ caused by saturation of the horizontal lines and that the sensor resolution will be lessened because up to two of the horizontal lines may be only partially within the nip width. The effect on the resolution is, however, substantially reduced by forming the vertical lines much longer than the horizontal lines. It will further be appreciated that these concerns are eliminated in the alternative construction wherein the horizontal lines of the ink traces 47, 49 are formed of nonconductive material.

With reference to FIGS. 13–16, a membrane sensor 50 according to a third embodiment of the present invention is shown therein. According to the third embodiment, the sensors 4 of the sensing system 1 are membrane sensors 50. The sensor 50 has an effective sensing length SL and an effective sensing width SW, preferably having dimensions as described above with respect to the sensor 40. Each sensor 50 includes a plate or strip 52 and an opposed plate or strip 54. Preferably, the strips 52 and 54 are both flexible and resilient. The strips 52, 54 are separated by a gap 56 and are coupled together by electrically insulative edge supports (not shown) in parallel relation. The sensor 50 is adapted to be installed in the nip such that the effective sensing length SL extends perpendicular to the lengths of the rolls and across the nip width NW of the nip rolls 5,6. Lead lines L, and $L_2$ are connected to opposite ends of the strip 52. The sensor 50 provides a variable resistance $R_f$ between the lead lines $L_1$ and $L_2$.

The lead lines $L_1$, $L_2$ may be connected to a suitable resistance measuring, conditioning and converting circuit as discussed above to provide a signal corresponding to the resistance $R_f$. The strip 52 is preferably formed of a homogeneous, constant property material having a measurable resistance. Each of the strips 52, 54 preferably has a uniform thickness and a uniform width SW. The per unit length electrical resistance of the material should be uniform so that the total resistance of the strip 52 varies linearly with its length. Preferably, the strip 52 is formed of carbon. The strip 54 is preferably formed of a homogeneous material having a resistance substantially less than the material of the strip 52. More preferably, the strip 54 is formed of silver, gold or some other highly conductive material. Alternatively, both strips may be formed of a resistive material such as carbon.

Figure 13:
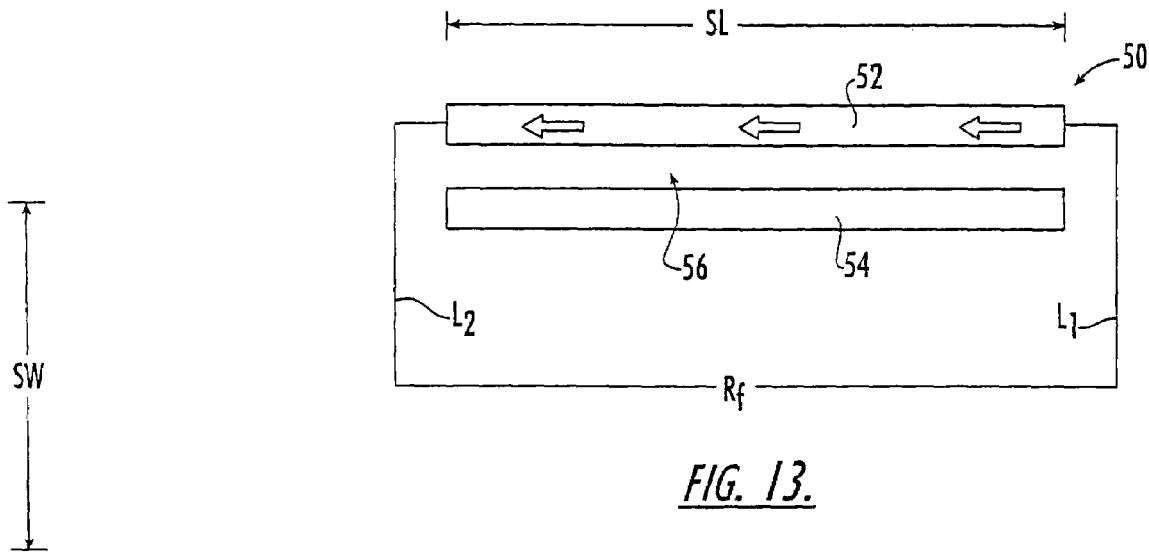
FIG. 13 is a side, schematic view of a two lead membrane sensor according to a further embodiment of the present invention, the membrane sensor shown in an open, non-nipped position.

When the sensor 50 is not under the load of the nip rolls, it will assume the open, non-nipped position of FIG. 13. All current between the leads $L_1$ and $L_2$ will flow through the carbon strip 52, as indicated by directional arrows in FIG. 13. The sensor 50 will then have a resistance value $R_f$ equal to the resistance of the entire length of the carbon strip 52.

Figure 15:
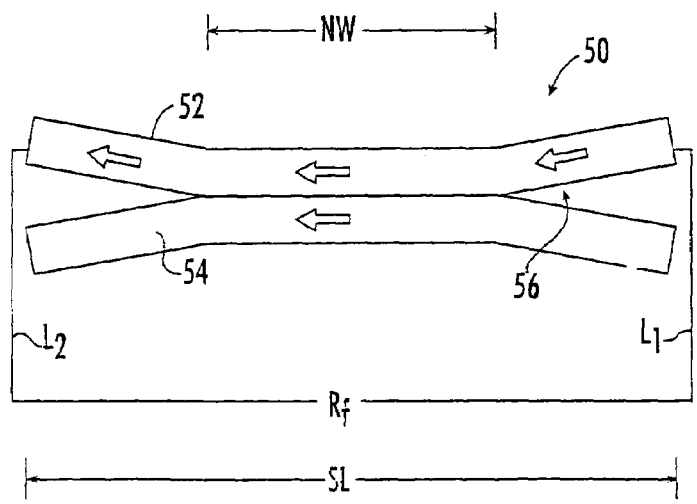
FIG. 15 is a side, schematic view of the sensor of FIG. 13 shown in a closed, nipped position.
Figure 14:
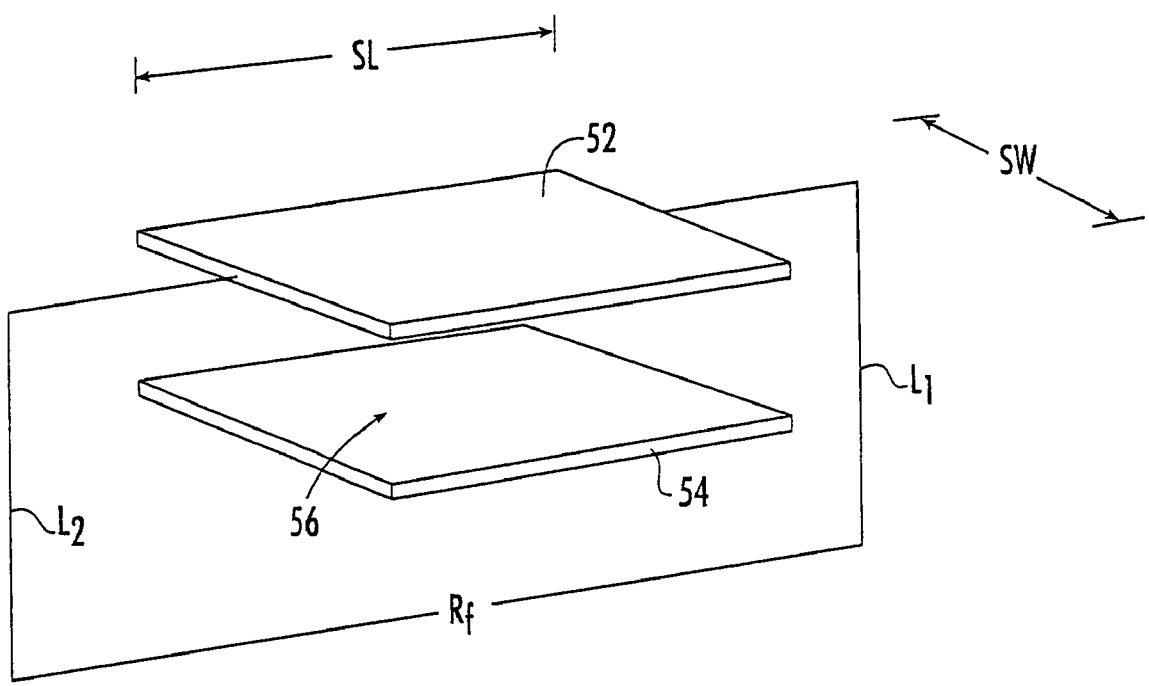
FIG. 14 is a perspective, schematic, exploded view of the sensor of FIG. 13.

When the sensor 50 is in the nip and loaded across the nip width NW, the adjacent, opposed segments of the strips 52 and 54 within the nip width NW, and thus having lengths equal to the nip width NW, are forced together, as shown in FIG. 15, eliminating a portion of the gap 56 and establishing electrical continuity between the strips 52, 54. Because the silver strip 54 has substantially less resistance per unit length than the carbon strip 52, between the end points of the nip width NW most of the current between leads $L_1$ and $L_2$ flows through the portion of the silver plate in the nip width NW, as indicated by the double arrow. A relatively small amount of current may also flow through the portion of the carbon strip 52 in the nip width NW, as indicated by the single arrow. Thus, the carbon strip 52 is effectively short-circuited or bypassed in the nip width and the resistance value $R_f$ is reduced proportionally to the size of the nip width. The extent of the bypass, and thus the extent of the reduction in the resistance $R_f$, will vary with the length of the nip width NW and the corresponding length of contact between the strips 52, 54. For greater nip widths, the resistance $R_f$ will be lower, and for smaller nip widths, the resistance $R_f$ will be greater.

The resistance $R_f$ may be measured and converted to a corresponding voltage signal in known manner. It will be readily appreciated that an equation or calibration graph, chart or table correlating the resistance $R_f$ and the nip width NW can be produced. Using the equation or calibration reference, an operator or software may conveniently and accurately determine the sensed nip width. Notably, the magnitude of the pressure on the sensor 50 will not affect the resistance Rf of the sensor and therefore will not be reflected in the signal.

Figure 16:
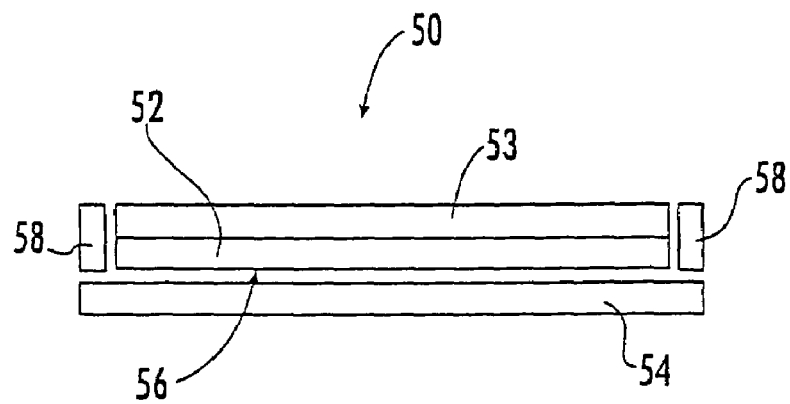
FIG. 16 is an end, schematic view of the sensor of FIG. 13 including soft edge members.

Conventional membrane switches are typically provided with relatively rigid, reinforced edges. While reinforced edges do not present a drawback for conventional applications such as touch pads, if employed in the nip width sensor 50 such reinforced edges may carry an undesirably large proportion of the nip load. As a result, the accuracy of the readings from the sensor may be materially reduced. The sensor 50 may be constructed as shown in FIG. 16 to obviate this concern. In place of reinforced edges, the sensor 50 preferably includes soft, compressible, electrically insulative edges 58 coupling the strips 52, 54. The edges 58 may be formed of rubber and should tolerate compressive strains of at least about 50%. A spacer strip 53 is provided to reduce the compression requirements of the insulative edges 58.

Figure 17:
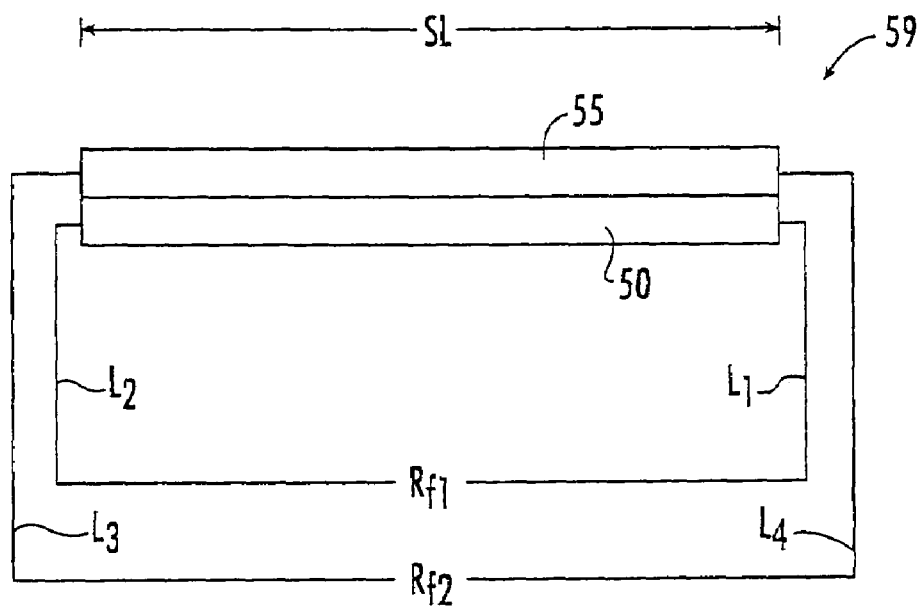
FIG. 17 is a side, schematic view of a sensor according to a further embodiment of the present invention including a membrane sensor and a force sensitive resistor sensor.

With reference to FIG. 17, a sensor 59 according to a further embodiment of the present invention is shown therein. Sensors 59 may be used as the sensors 4 of the sensing system 1. The sensor 59 preferably has an effective sensor length SL and an effective sensor width (not shown) having dimensions as described above with respect to the sensor 40. The sensor 59 includes a large pad force sensitive resistor sensor (FSR sensor) 55 corresponding to the large pad force sensitive resistor sensor 30 described above. The FSR sensor 55 is secured in contact with and in parallel relation to a membrane sensor 50 as just described. The sensor 50 has leads $L_1$ and $L_2$ for measuring the resistance $R_{f1}$ between the ends of the sensor 50 and determining the nip width in the manner described above. The FSR sensor 55 has leads $L_3$ and $L_4$ for measuring the resistance $R_{f2}$. Notably, because the area of contact can be determined from the membrane sensor 50, the nip pressure on the FSR sensor 55 can be more accurately calculated. This feature is particularly advantageous, for example, when measuring nip presses wherein the nip width is fixed by a shoe so that the nip width does not vary significantly even though the pressure may.

Figure 18:
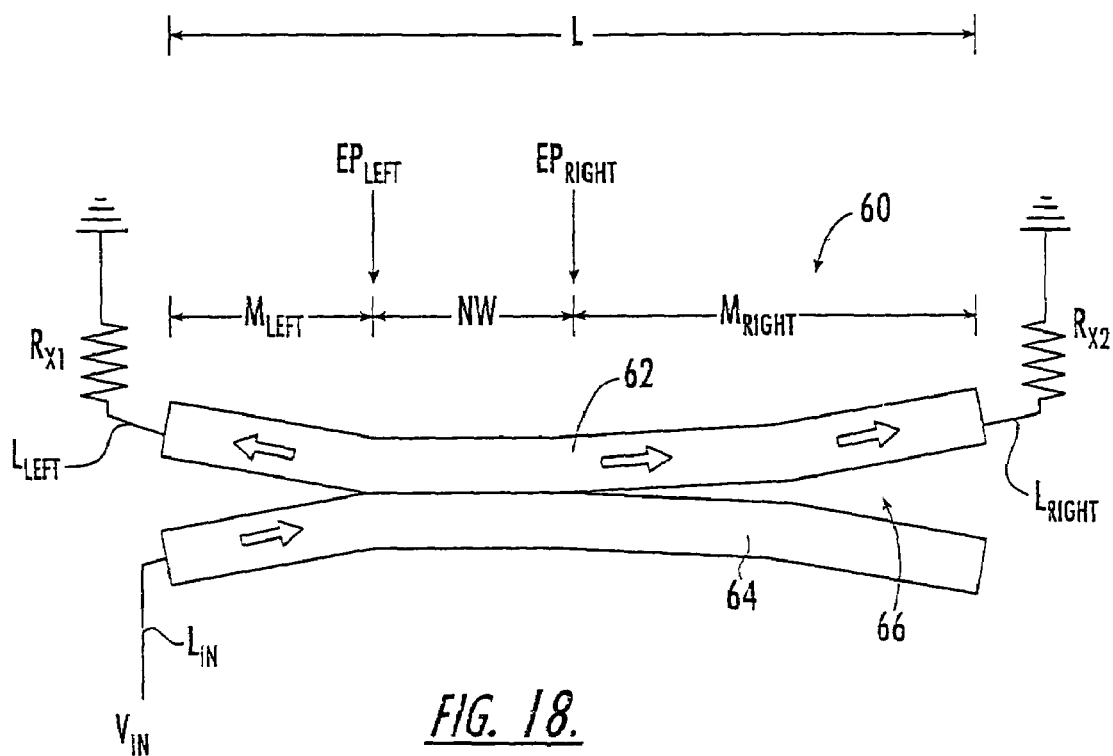
FIG. 18 is a side, schematic view of a three lead membrane sensor according to a further embodiment of the present invention, the sensor shown in a closed, nipped position.

With reference to FIG. 18, a membrane sensor 60 according to a further embodiment of the present invention is shown therein. Membrane sensors 60 may be used as the sensors 4 of the sensing system 1. The sensor 60 includes a strip 62, a strip 64, and a gap 66 corresponding to and constructed in the same manner as elements 52, 54 and 56, respectively, of the sensor 50. The sensor 60 differs from the sensor 50 in that it includes three leads $L_{in}$, $L_{left}$ and $L_{right}$. A voltage source $V_{in}$ is connected to the silver strip 64 by means of the lead Lin. The left and right opposed ends of the carbon strip 62 are connected to ground by means of the leads $L_{Left}$ and $L_{Right}$. Resistors $R_{X1}$ and $R_{X2}$ of known, constant resistance value are provided between the ends of the carbon strip 62 and the electrical grounds.

When the sensor 60 is not in the nip (not shown), strips 62 and 64 are completely separated by the gap 66 and the sensor 60 provides infinite resistance between $V_{in}$ and the grounds. When the sensor 60 is placed in the nip, the segments of the strips 62 and 64 having lengths and locations the same as the nip width NW are forced into electrical contact as shown in FIG. 18, providing electrical continuity between $V_{in}$ and the grounds. Because the silver strip 64 is substantially more conductive than the carbon strip 62, substantially all of the current flows as indicated by the double arrows in FIG. 18, namely: (1) from the lead $L_{in}$, through the silver strip 64 up to nip width end point $EP_{Left}$, and leftward through the carbon strip 62 to ground; and (2) from the lead $L_{in}$, through the silver strip 64 up to nip width endpoint $EP_{Right}$, and rightward through the carbon strip 62 to ground. The segment of the carbon strip 62 between the nip width endpoints $EP_{Left}$ and $EP_{Right}$ is effectively bypassed.

Figure 19:
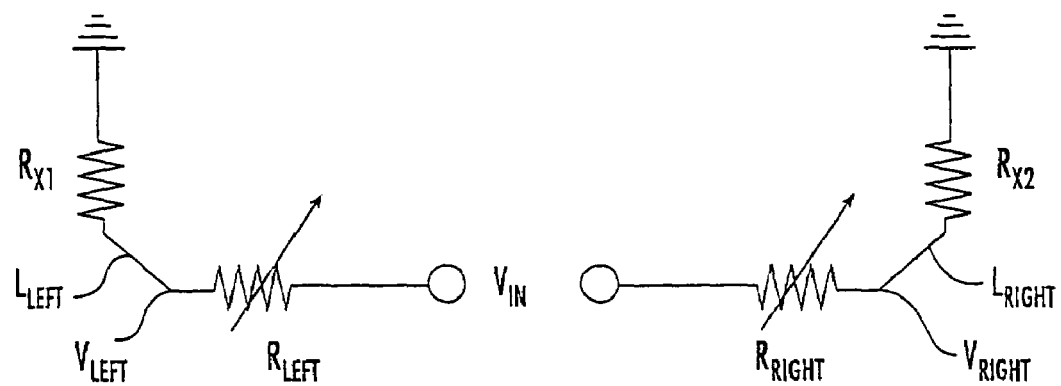
FIG. 19 is a schematic electrical circuit diagram corresponding to the three lead membrane sensor of FIG. 18.

The membrane sensor 60 of FIG. 18 may be represented by the electrical circuit diagram of FIG. 19. $R_{Left}$ represents the resistance of the portion of the carbon strip between the endpoint $EP_{Left}$ and the left end of the carbon strip which has a length $M_{Left}$. $R_{Right}$ represents the resistance of the portion of the carbon strip between the endpoint $EP_{Right}$ and the right end of the carbon strip which has a length $M_{Right}$. The resistance values may be determined by measuring the voltage $V_{Left}$ at the left end of the carbon strip and the voltage $V_{Right}$ at the right end of the carbon strip. The unit length resistance RC (e.g., ohms/inch) of the carbon strip 62 will be known, the carbon strip preferably being of uniform width, thickness and properties throughout its length SL. The resistance values of $R_{X1}$ and $R_{X2}$ and the voltage $V_{in}$ will also be known. With the voltage. $V_{left}$ and $V_{Right}$ known from measurement by means of the associated electronics, the length $M_{left}$ may be determined by the following equation:

$$M_{Left} = \frac{R_{Left}}{RC} = \frac{R_{X1}\left[\frac{V_{in}}{V_{Left}} - 1\right]}{RC}$$

and the length $M_{Right}$ may be determined by the following equation:

$$M_{Right} = \frac{R_{Right}}{RC} = \frac{R_{X2}\left[\frac{V_{in}}{V_{Right}} - 1\right]}{RC}$$

The length SL of the carbon strip 62 being known, the nip width NW, as well as the exact positions of the nip width endpoints $EP_{Left}$ and $EP_{Right}$ may be determined by simple subtraction.

It will be appreciated by those of skill in the art that other methods of determining the values of resistances $R_{Left}$ and $R_{Right}$ may be employed. For example, the current through the corresponding portions of the carbon strip 62 may be measured. Once the resistance values $R_{Left}$ and $R_{Right}$ are determined, the lengths $M_{Left}$ and $M_{Right}$ may be calculated by the equations:

$$M_{Left} = \frac{R_{Left}}{RC}$$

and $$M_{Right} = \frac{R_{Right}}{RC}$$

Figure 20:
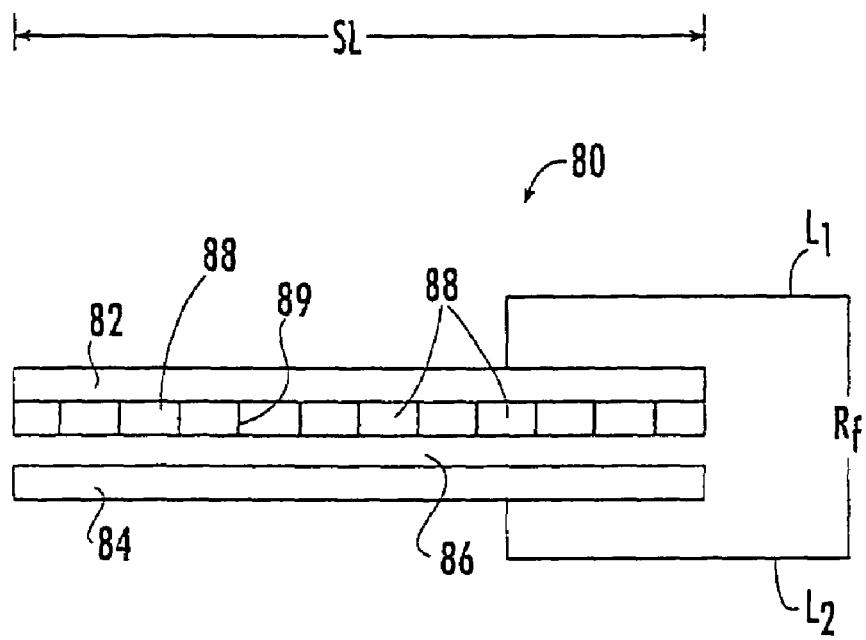
FIG. 20 is a side, schematic view of a segmented semiconductor sensor according to a further embodiment of the present invention shown in an open, non-nipped position.
Figure 21:
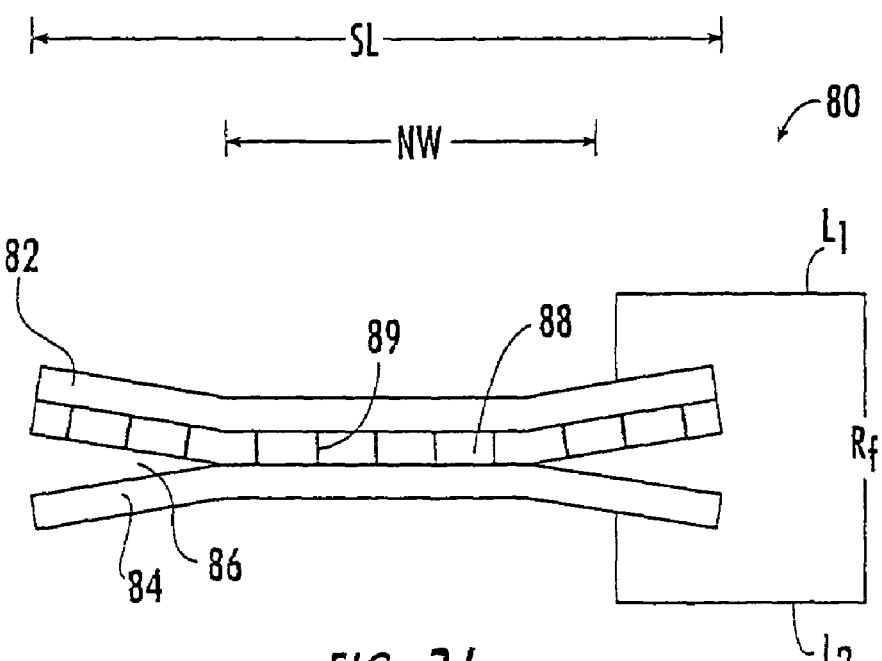
FIG. 21 is a side, schematic view of the sensor of FIG. 20 shown in a closed, nipped position.

A sensor 80 according to a further embodiment, as shown in FIGS. 20 and 21, may be used to provide substantially direct nip width measurements. Sensors 80 may be incorporated into the sensing system 1 as the sensors 4, preferably having effective width (not shown) and effective length SL dimensions as set forth above with respect to the sensor 30. The sensor 80 provides a signal directly corresponding to the nip width with no substantial variation for different contact pressures. The sensor 80 may be cost effectively manufactured without requiring the provision and assembly of numerous discrete switches.

The sensor 80 includes a flexible, resilient strip 82 with an electrically conductive material such as silver printed thereon. Parallel strips 88 of semiconductor material extend across the silver strip 82 transverse to the length dimension SL of the sensor 80. Electrically insulative material 89 separates adjacent semiconductor segments 88. A second flexible, resilient, conductive strip 84, which may also be printed with silver, is disposed parallel to the strip 82 and faces the semiconductor material. Lead lines $L_1$ and $L_2$ are connected to the silver strips 82 and 84, respectively. The lead lines $L_1$ and $L_2$ may be connected to a suitable resistance measuring, conditioning and converting circuit as discussed above to provide a signal corresponding to the resistance $R_f$ between the leads. The semiconductor material is preferably silicon. The insulative material 89 is preferably Kapton. Alternatively, the insulative material 89 may be replaced by insulative air gaps.

Prior to placement in a press nip, sensor 80 is biased to assume the open position shown in FIG. 20, wherein a gap 86 completely separates the silver strip 84 and the semiconductor material segments 88. As a result, the resistance $R_f$ is infinite.

When the sensor 80 is placed in the press nip with the sensor length SL running transverse to the roll axis, the portions of the strips 82, 84 in the nip width NW are forced together by the rolls as shown in FIG. 21, forcing the corresponding portion of the silver strip 84 into contact with the adjacent semiconductor segments 88. In this way, the circuit between the silver strips 82, 84 (and therefore between the lead lines $L_1$ and $L_2$) is completed and produces a corresponding resistance $R_F$ across sensor 80. Notably, the resistance RF will directly correspond to the area of contact and, in particular, the number of semiconductor segments 88 which are in contact with the silver strip 84. Notably, current can only flow between the silver strips 82 and 84 vertically. If the manufacturing techniques and material consistency allow the resistance RS (not represented in the drawings) of the semiconductor material and widths of the semiconductor segments (i.e., extending parallel to the sensor length SL) to be known, then the nip width may be conveniently calculated as follows:

$$\text{nip width} = \frac{K_f}{R_f}$$

where
  $R_f$ is the measured resistance; and
  $K_f$ is a sensor coefficient=$W_s R_s$
where
  $R_s$ is the resistance of the semiconductor block through the thickness; and
  $W_s$ is the width of each semiconductor block in the direction along the sensor length SL.

Alternatively, the sensor 80 may be conveniently calibrated to provide a nip width reference chart, table or graph. For a given resistance $R_f$ (preferably converted to a voltage signal), the operator or computer can identify the corresponding nip width value.

Preferably, the semiconductor material, thickness and area are selected to provide a maximum resistance $R_f$ (e.g., when only one semiconductor segment 88 is in contact with the silver strip 84) of about 100,000 ohms and a minimum resistance $R_f$ (e.g., when the greatest anticipated nip width is measured) of about 400 ohms. Such resistance values serve to provide a resistance $R_f$ which is readily distinguishable from the existing lead line resistances while maintaining a relatively high current so that the created radio frequency noise is low as compared to the signal resistance.

The sensitivity or nip width resolution of the sensor 80 will depend on the widths of the semiconductor segments 88. The greater the number of segments over the length SL, the greater the resolution will be. The sensor 80 may be manufactured using micromachining techniques.

Figure 22:
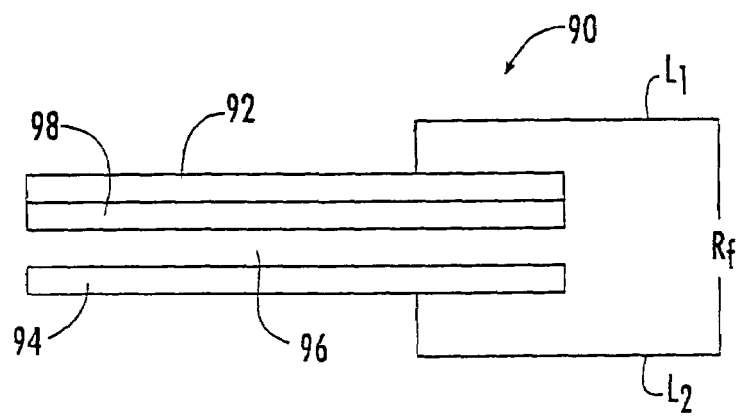
FIG. 22 is a side, schematic view of an anisotropic semiconductor sensor according to a further embodiment of the present invention.

In order to provide nip width measurements having more fine resolution, a semiconductor sensor 90 according to a further embodiment and as shown in FIG. 22 may be used. The sensors 90 may be used in the sensing system 1 as the sensors 4. Preferably, the sensor 90 has width and length dimensions as described above with respect to the sensor 30. The sensor 90 has opposed, flexible, resilient silver strips 92, 94, an air gap 96 therebetween, and lead lines $L_1$ and $L_2$ connected to strips 92 and 94, respectively. The sensor 90 differs from the sensor 80 in that the segments 88 and the insulative material 89 are replaced with a substantially homogeneous layer of an anisotropic semiconductor material. More preferably, the semiconductor material is orthotropic. Because only vertical conductivity is provided between the silver strips, the electrical behavior of semiconductor material 98 will be similar to that of semiconductor material 88. The same techniques for converting the resistance $R_f$ to a corresponding nip width may be used.

Figure 23:
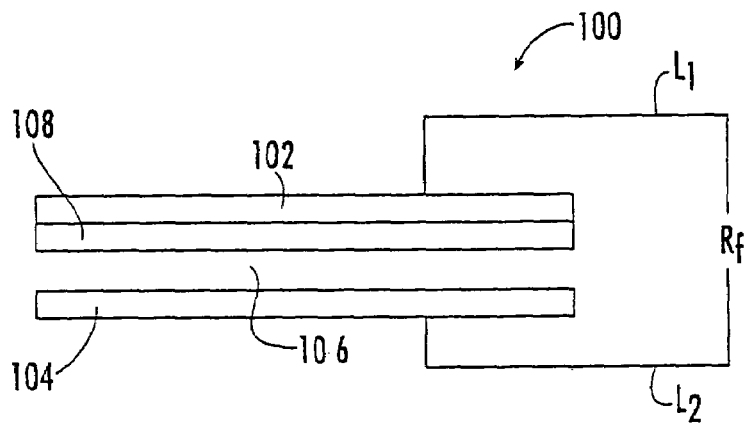
FIG. 23 is a side, schematic view of a thin layer semiconductor sensor according to a further embodiment of the present invention.

As a further alternative, a sensor 100 according to a further embodiment as shown in FIG. 23 may be used. Sensors 100 may be used in the sensing system 1 as the sensors 4. The sensor 100 preferably has dimensions as described for the sensor 30. The sensor 100 has elements 102, 104, 106, $L_1$ and $L_2$ corresponding to elements 92, 94, 96, $L_1$ and $L_2$, respectively, of the sensor 90. The sensor 100 differs from the sensor 90 in that a relatively thin, isotropic semiconductor layer 108 is used in place of the anisotropic semiconductor layer 98. Because the semiconductor layer 98 is relatively thin, the path of least electrical resistance between the silver strips 92, 94 is directly between the strips, i.e., vertically. Accordingly, substantially all of the current between the lead lines $L_1$, $L_2$ will flow through the portion of the semiconductor layer in contact with the silver strip 104, to the exclusion of the remainder of the semiconductor layer. Thus, the resistance $R_f$ of the sensor 100 is dependent on the contact area and therefore the resistance $R_f$ corresponds substantially directly to the nip width being measured. A calibration curve, chart or table may be used to determine the nip width from the measured resistance $R_f$. The semiconductor material 108 is preferably carbon filled resin. The thickness of the semiconductor layer 108 should be no greater than 0.2 inch, and preferably is between about 0.001 and 0.1 inch.

In some applications, it will be desirable to "step up" the resistance of the sensor so that the sensor better integrates with the associated signal converting electronics and to better distinguish variations in the sensor resistance from the lead line resistances. While this may be accomplished by putting a suitably sized resistor in line with the sensor, such supplementation may tend to reduce the sensitivity to different nip widths. In any event, it is desirable to maintain the sensor behavior characteristics described above, namely, that the resistance $R_f$ is infinite or has a relatively high maximum resistance value when the sensor is open and the sensor resistance $R_f$ diminishes predictably from a maximum value to a minimum value as the nip width increases.

Figure 24:
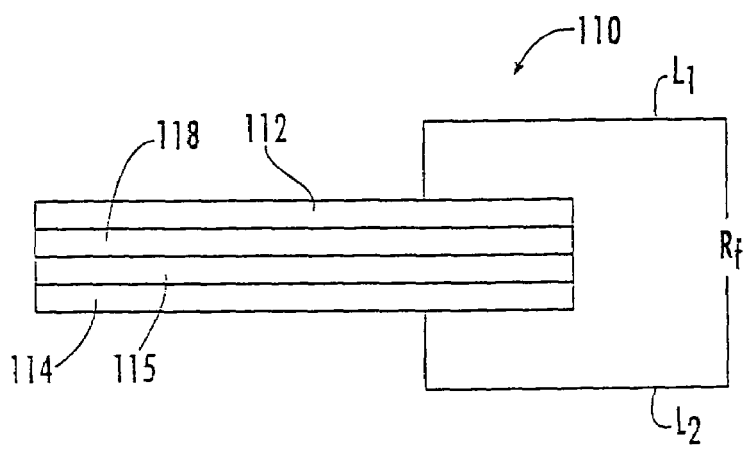
FIG. 24 is a side, schematic view of a semiconductor sensor according to a further embodiment of the present invention including a force sensitive resistor.

To accomplish the foregoing, a sensor 110 according to a further embodiment and as shown in FIG. 24 may be used. Sensors 110 may be incorporated into the sensing system 1 as the sensors 4. The sensor 110 preferably has dimensions as described for the sensor 30. The sensor 110 has silver strips 112 and 114 with lead lines $L_1$ and $L_2$, respectively, connected thereto. A semiconductor layer 118 is positioned adjacent the silver strip 112 and may be a segmented semiconductor corresponding to the semiconductor layer 88, an anisotropic semiconductor layer corresponding to the layer 98, or a thin semiconductor layer corresponding to the layer 108. The sensor 110 differs from the sensors 80, 90 and 100 in that the air gaps of those sensors are replaced by a force sensitive resistive material layer 115. The force sensitive resistive material is preferably carbon filled rubber. The force sensitive resistive material has a relatively low saturation value. That is, the force sensitive resistive layer 115 will reach its lowest resistance value when placed under a contact pressure and contact area well below that anticipated from the expected nip width being measured.

When the sensor 110 is not disposed in the press nip, the force sensitive resistive material layer 115 will provide infinite resistance is between silver strip 114 and semiconductor layer 118 so that the resistance $R_f$ is infinite. When the force sensitive resistive material layer 115 is compressed under the expected nip width, the force sensitive resistive layer saturates so that it provides electrical continuity between the silver strip 114 and the semiconductor layer 118, while presenting a prescribed minimum resistance $R_{FSR}$ (e.g., 20 ohms) between the layers 114, 118. The sensor 110 will then have a resistance $R_F$ which is proportional to the corresponding nip width, but which is also increased by the amount $R_{FSR}$.

Figure 25:
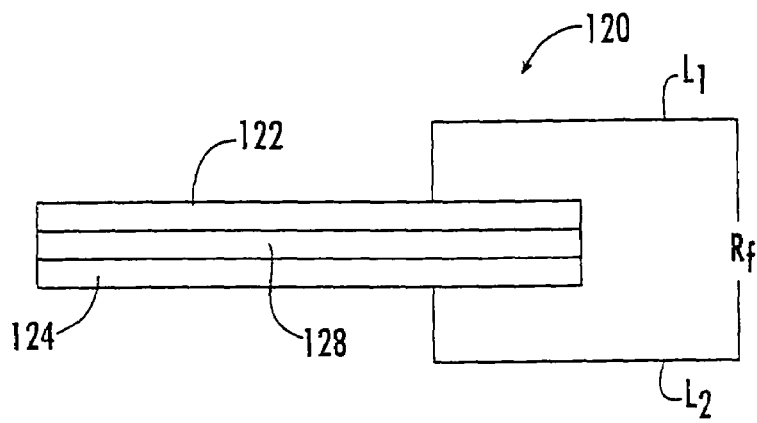
FIG. 25 is a side, schematic view of a filled composite semiconductor sensor according to a further embodiment the present invention.

A sensor 120 according to a further embodiment is shown in FIG. 25. Sensors 120 may be incorporated into the sensing system 1 as the sensors 4. The sensor 120 has opposed silver strips 122 and 124 with a filled composite layer 128 sandwiched therebetween. Lead lines $L_1$ and $L_2$ are connected to the strips 122 and 124, respectively. The filled composite 128 is a compressible material such as rubber filled with conductive particles (e.g., gold or carbon).

Prior to insertion of the sensor 120 into a press nip, the resistance $R_f$ of the sensor will be a relatively high, constant value. When the sensor 120 is placed in the press nip, in the area of the nip width the silver strips 112 and 124 are forced toward one another, thereby compressing the filled composite 128. By compressing the volume of the rubber, the density of the conductive particles in the composite and, hence, the contact between the conductive particles, is increased, thereby reducing the resistance of the filled composite. As a result, the resistance $R_f$ of the sensor 120 is proportionally reduced. The nip width may be determined by reference to a calibration curve, chart or table.

Figure 26:
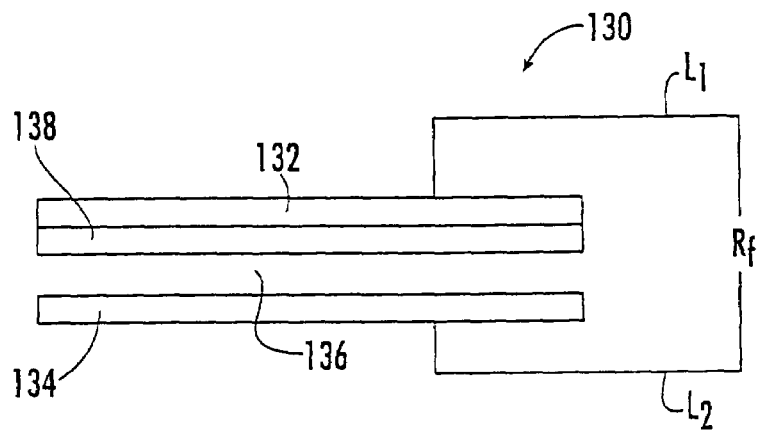
FIG. 26 is a side, schematic view of another filled composite semiconductor sensor according to a further embodiment the present invention.

With reference to FIG. 26, a sensor 130 according to a further embodiment of the present invention is shown therein. Sensors 130 may be incorporated into the sensing system 1 as the sensors 4. The sensor 130 has elements 132, 134, 138, $L_1$ and $L_2$ corresponding to elements 122, 124, 128, $L_1$ and $L_2$, respectively, of the sensor 120. The sensor 130 differs from the sensor 120 in that an air gap 136 is provided between the silver strip 134 and the filled composite 138.

Figure 27:
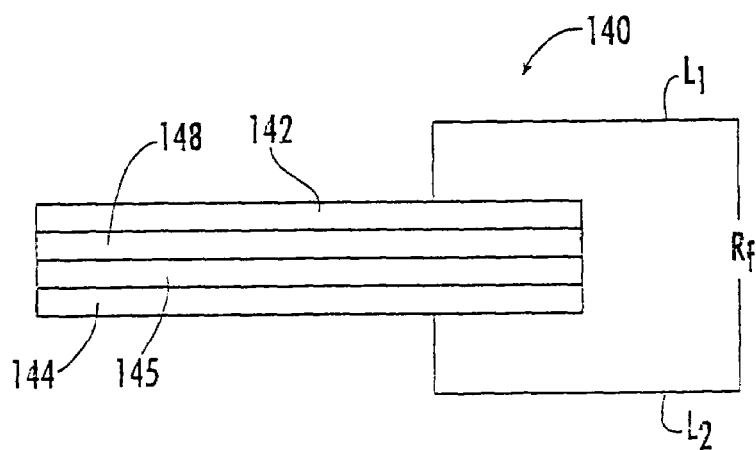
FIG. 27 is a side, schematic view of a filled composite semiconductor sensor according to a further embodiment the present invention including a force sensitive resistor layer.

With reference to FIG. 27 a sensor 140 according to a further embodiment is shown therein. Sensors 140 may be incorporated into the sensing system 1 as the sensors 4. The sensor 140 has elements 142, 144, 148, $L_1$ and $L_2$ corresponding to elements 132, 134, 138, $L_1$ and $L_2$, respectively, of the sensor 130. The sensor 140 differs from the sensor 130 in that the air gap 136 is replaced with a force sensitive resistive material layer 145 corresponding to the force sensitive resistive material layer 115.

Figure 28:
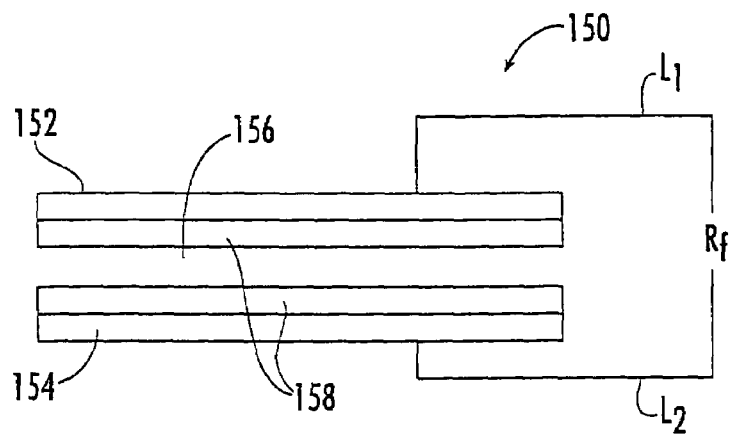
FIG. 28 is a side, schematic view of a dual semiconductor layer sensor according to a further embodiment the present invention.

With reference to FIG. 28, a sensor 150 according to a further embodiment of the present invention is shown therein. Sensors 150 may be incorporated into the sensing system 1 as the sensors 4. The sensor 150 has opposed silver strips 152 and 154 having lead lines $L_1$ and $L_2$, respectively, connected thereto. A semiconductor layer 158 is secured adjacent each of the silver strips 152, 154. Each semiconductor layer 158 may be a segmented semiconductor corresponding to the semiconductor layer 88, an anisotropic semiconductor corresponding to the semiconductor layer 98, a relatively thin semiconductor layer corresponding to the semiconductor layer 108, or a filled composite corresponding to filled composite 128. The two semiconductor layers 158 may be formed of the same or different material. An air gap 156 is provided between the semiconductor layers 158.

Figure 29:
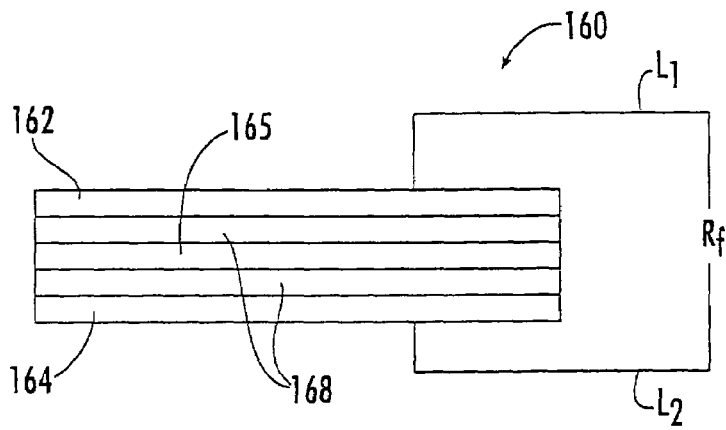
FIG. 29 is a is a side, schematic view of another dual semiconductor layer sensor according to a further embodiment the present invention, the sensor including an force sensitive resistor.

With reference to FIG. 29, a sensor 160 according to a further embodiment of the present invention is shown therein. Sensors 160 may be incorporated into the sensing system 1 as the sensors 4. The sensor 160 has elements 162, 164, 168, $L_1$ and $L_2$ corresponding to elements 152, 154, 158, $L_1$ and $L_2$ of the sensor 150. The sensor 160 differs from the sensor 150 in that the air gap 156 is replaced with a force sensitive resistive material layer 165 corresponding to the force sensitive resistive material layer 115.

Figure 30:
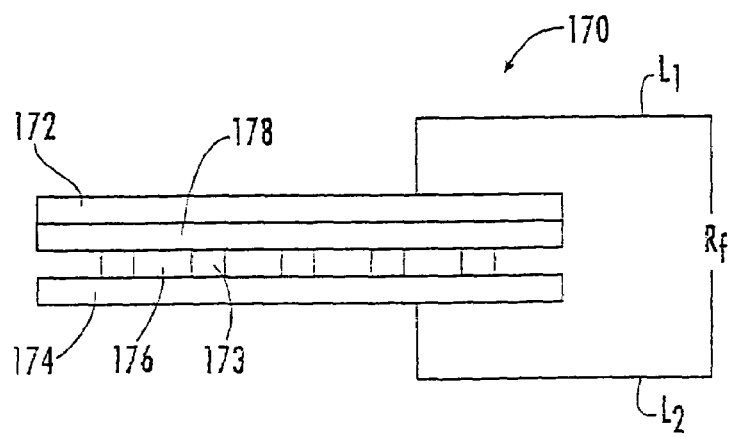
FIG. 30 is a side, schematic view of a semiconductor sensor according to a further embodiment the present invention, the sensor including spacer lines or dots.

With reference to FIG. 30, a sensor 170 according to a further embodiment of the present invention is shown therein. Sensors 170 may be incorporated into the sensing system 1 as the sensors 4. The sensor 170 has opposed silver strips 172 and 174 with lead lines $L_1$ and $L_2$, respectively, connected thereto. A semiconductor layer 178 is secured adjacent the silver strip 172. The semiconductor layer 178 may be a segmented semiconductor corresponding to the semiconductor layer 88, an anisotropic semiconductor layer corresponding to the semiconductor layer 98, a relatively thin semiconductor layer corresponding to the semiconductor layer 108, or a filled composite semiconductor corresponding to the filled composite 108. An air gap 176 separates the silver strip 174 from the semiconductor layer 178. In order to maintain the air gap between the silver layer 174 and the semiconductor layer 178 in the regions of the sensor 170 not within the nip width, lines or dots 173 are positioned between the silver strip 174 and the semiconductor layer 178. The lines or dots 173 may be formed of resistive or electrically insulative material.

It will be appreciated that lines or dots of resistive or insulative material as just described may be employed in various of the above-described sensors as well.

Figure 31:
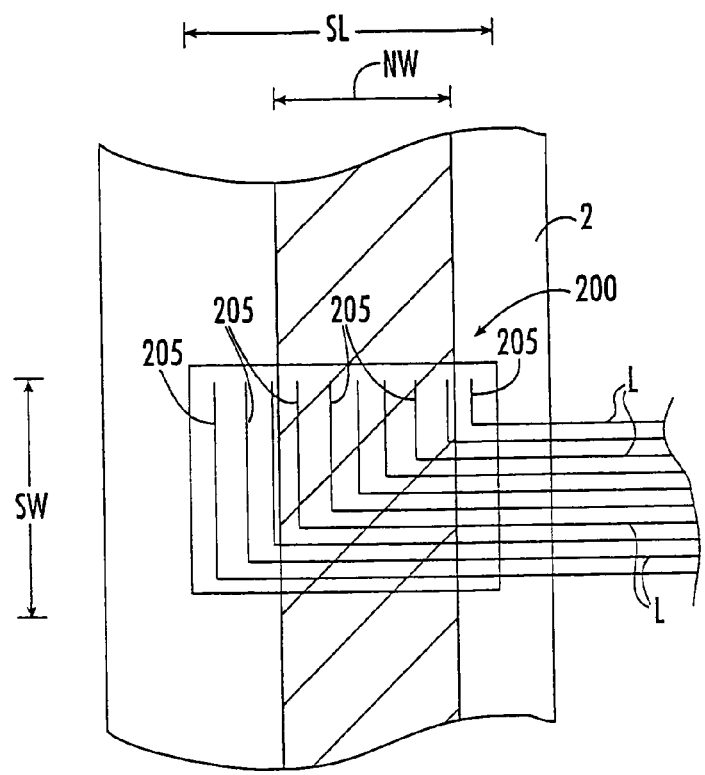
FIG. 31 is a top, schematic view of the sensing strip of FIG. 1 including a sensor according to a further embodiment of the present invention, wherein a plurality of sensing lines are each provided with a respective lead line.

With reference to FIG. 31, a sensor 200 according to a further embodiment is shown therein. Sensors 200 may be used in the sensing system 1 as the sensors 4. Generally, the sensor 200 includes a plurality of printed force sensitive resistive ("FSR") material sensing lines 205 extending parallel to the roll axis and spaced apart from one another. The sensor 200 and the sensing lines 205 are constructed similarly to the sensor 40 and the sensing lines 41A (see FIGS. 11 and 12). Namely, the sensor 200 includes a pair of opposed film layers corresponding to the layers 42, 44, separated by a gap corresponding to the gap 40A, and each of the sensing lines 205 include silver and force sensitive resistive material ink traces corresponding to ink traces 43, 45 and 47, 49, respectively.

A respective lead line L is connected to one end of the silver ink trace of each of the respective sensing lines 205 on one film layer (e.g., the upper layer corresponding to layer 42) thereof. The lead lines L may be wires or conductive ink traces. The lead lines L are connected to the electronics 10 and a voltage source. The opposite ends of the silver ink traces on the other film layer (e.g., the lower layer corresponding to layer 44) are connected to individual electrical grounds or a common ground (for clarity, not shown). The electronics 10 include means for measuring the resistance of each sensing line 205. Suitable means for measuring the resistance will be apparent to those of skill in the art and may include, for example, a volt meter and a resistor of known value in the sensing line between the sensing line and the voltage source. It will be appreciated that the positions of the voltage source and the ground(s) may be reversed. Separate voltage sources and measuring means may be provided for each sensing line 205 or, alternatively, all or some of the sensing lines may be connected to a multiplexer (not shown) which cyclically connects the sensing lines 205 to the measuring electronics. In certain embodiments, the resistance measuring electronics may consist of a simple "Hi-Lo" device which merely determines whether a given sensing line 205 is providing at least a threshold voltage and does not determine the amount of resistance of the sensing line.

According to one embodiment of the sensor 200, the FSR material of the sensing lines 205 has a relatively low saturation value compared to the anticipated nip pressure across the nip width. That is, the FSR material is chosen such that it provides its minimum resistance at a pressure less than a prescribed nominal pressure. The prescribed nominal pressure is preferably low enough that substantially any portion of the sensor in the nip width will be subjected to at least this amount of pressure, within the limitations of the materials and electronics. Preferably the prescribed nominal pressure is about 5% of the highest pressure (i.e., peak pressure) which is expected to be experienced anywhere within the nip width. Alternatively, the prescribed nominal pressure may be a fixed amount, preferably about 5 psi or less. Therefore, each line 205 which is disposed in the nip width will be saturated or "on" as recognized by the electronics connected to the lead lines L. In this embodiment, the force sensitive material is preferably a known pressure sensitive ink such as one containing molybdenum disulfide.

The nip width NW may be measured by counting the number of sensing lines 205 in each sensor that provide a signal indicating that they are under pressure. If the lines are equally spaced, then the nip width is calculated by the line spacing multiplied by one less than the number of lines under pressure:

$$\text{NIP WIDTH} = \delta[N-1]$$

where

δ=the spacing between the lines,

N=number of lines contacted by the rolls.

The nip width sensitivity of this configuration is related to the space between the lines 205. For example, as the amount of space between the lines 205 is decreased, the accuracy of the nip width measurement improves.

Alternatively, the FSR material chosen for the sensing lines 205 may reach saturation at a pressure at least as high as, and preferably higher than, the highest anticipated pressure within the nip width. In this embodiment, the force sensitive material is preferably a known pressure sensitive ink, such as on containing molybdenum disulfide. In this case, the nip pressure upon any of the sensing lines 205 within the nip width will be sufficient to signal to the electronics that the line is under pressure and therefore in the nip width, so that the nip width may be directly determined. Additionally, the strength of the signal (i.e., the resistance value of the sensing line) may be used to determine the actual pressure on the sensing line from which the corresponding nip load can be determined.

As a further alternative (not shown), each sensing line 205 may be replaced with a membrane switch. Suitable membrane switches include carbon-based switches. Suitable membrane switches include membrane touch switches available from Topflight of York, Pa.

Figure 32:
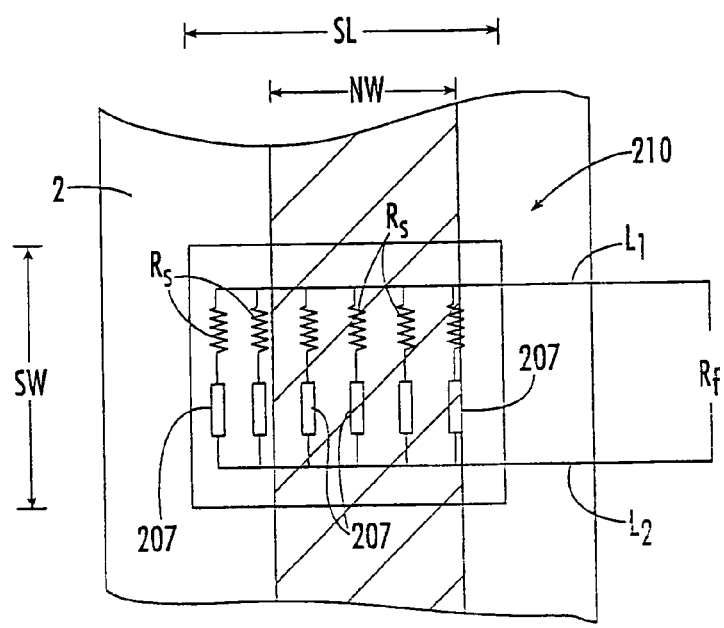
FIG. 32 is a top, schematic view of the sensing strip of FIG. 1 including a sensor according to a further embodiment of the present invention, wherein detecting means of the sensor are arranged in a parallel circuit.

With reference to FIG. 32 a sensor 210 according to a further embodiment is shown therein. The sensors 210 may be used in the sensing system 1 as the sensors 4. The sensor 210 includes a plurality of membrane switches 215 spaced apart along the width of the strip 2 and defining an effective sensor length SL between the endmost membrane switches 215. The membrane switches 215 are connected in parallel between lead lines $L_1$ and $L_2$, which may be wires or traces. Resistors $R_s$, preferably having equal resistance values, are connected in line with each membrane switch 215. The membrane switches 215 act as on/off switches. The membrane switches 215 within the nip width will assume an "on" condition, allowing current therethrough and, as a result, through the corresponding resistor $R_s$ and the lead lines $L_1$, $L_2$. The membrane switches not within the nip width will maintain an "off" condition, preferably fully preventing current therethrough. As a result, the circuit will have a resistance value $R_f$ corresponding to a number of membrane switches 215 which are disposed within the nip width and therefore "on". The operator or computer may determine the actual nip width corresponding to the measured resistance $R_f$ by reference to a calibration chart or theoretically.

In an alternative embodiment (not shown), the membrane sensors 215 of the sensor 210 may be replaced with sensing lines incorporating a relatively low saturation value FSR material as described above with respect to the sensor 200.

As a further alternative (not shown), the membrane sensors 215 of the sensor 210 may be replaced with sensing lines incorporating a relatively high saturation value FSR material as described above with respect to the alternative embodiment of the sensor 200.

Figure 33:
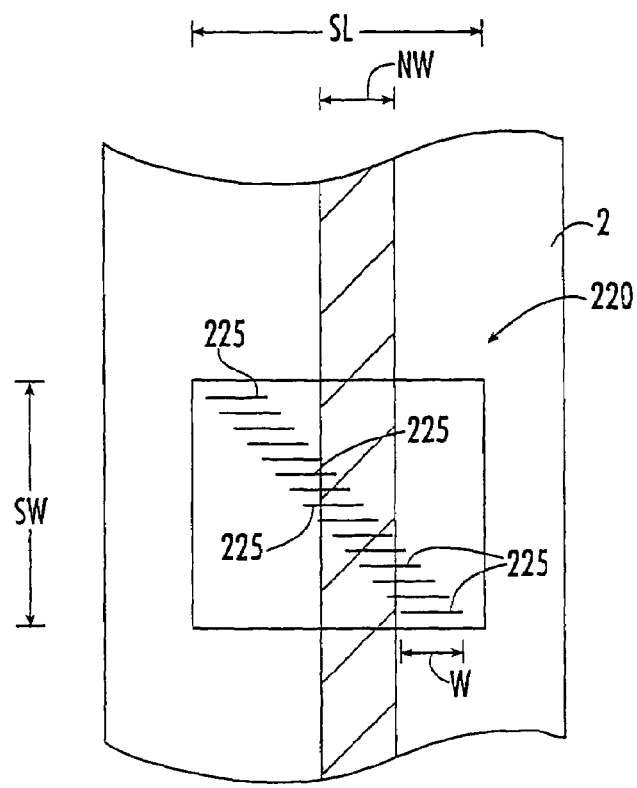
FIG. 33 is a top, schematic view of the sensing strip of FIG. 1 including a sensor according to a further embodiment of the present invention, wherein sensing lines of the sensor extend perpendicular to the lengths of the nip rolls and are each provided with a respective lead line.

With reference to FIG. 33, a sensor 220 according to a further embodiment and which may be used as a sensor 4 is shown therein. The sensor 220 includes FSR material sensing lines 225 and is constructed in the same manner as the sensor 200 except that the sensing lines 225 are differently configured than the sensing lines 205 (For clarity, the electrical ground(s) is/are not shown). FSR material sensing lines 225 are monitored by means of respective individual lead lines (not shown). Here, as in the configuration of FIG. 31, the nip width NW is measured by counting the numbers of the FSR material sensing lines 225 under pressure, but the nip width sensitivity is dependent upon the offset spacing between the pressure sensitive lines 225. Each sensing line has a respective individual effective sensing length W. Thus, the nip width is estimated as:

$$\text{NIP WIDTH} = \delta[(N) - w/\delta]$$

Where

δ=the offset spacing between pressure sensitive lines,

N=number of lines contacted by rolls, and

W=width of sensing line.

The FSR material may be chosen to have a relatively low or a relatively high saturation pressure value as described above with respect to the sensor 200.

Figure 34:
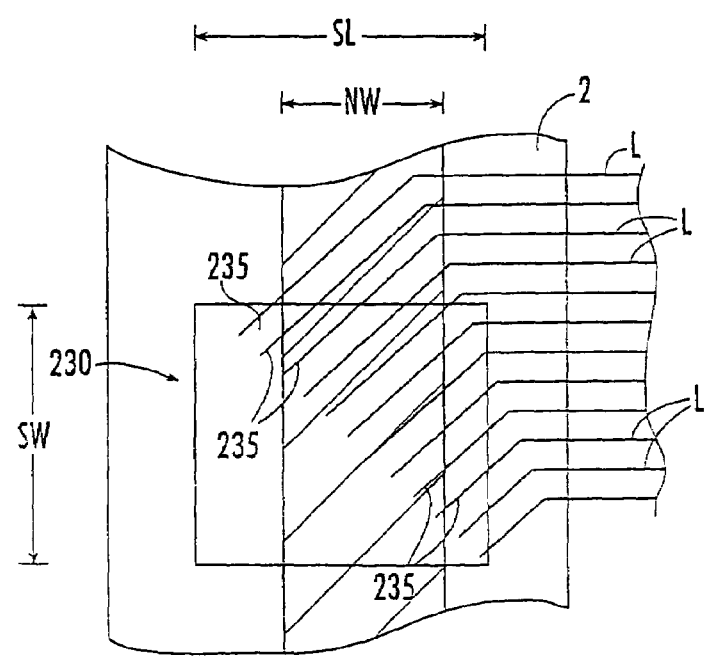
FIG. 34 is a top, schematic view of the sensing strip of FIG. 1 including a sensor according to a further embodiment of the present invention, wherein sensing lines of the sensor extend at an angle with respect to the lengths of the nip rolls and are each provided with a respective lead line.

With reference to FIG. 34, a sensor 230 according to a further embodiment and which may be used as a sensor 4 is shown therein. The sensor 230 includes FSR material sensing lines 235 and is constructed in the same manner as the sensor 200 except that the sensing lines 235 are differently configured that the sensing lines 205 (For clarity, the electrical ground(s) are not shown). FSR material sensing lines 235 are monitored by means of the respective individual lead lines L. The FSR material may be chosen to have a relatively low or a relatively high saturation pressure as described above with regard to the sensor 200. The sensing lines 235 are disposed at an angle with respect to the roll length. Nip width sensitivity in this case depends upon the offset spacing as well as the angle at which the lines intersect the roll axis.

Figure 35:
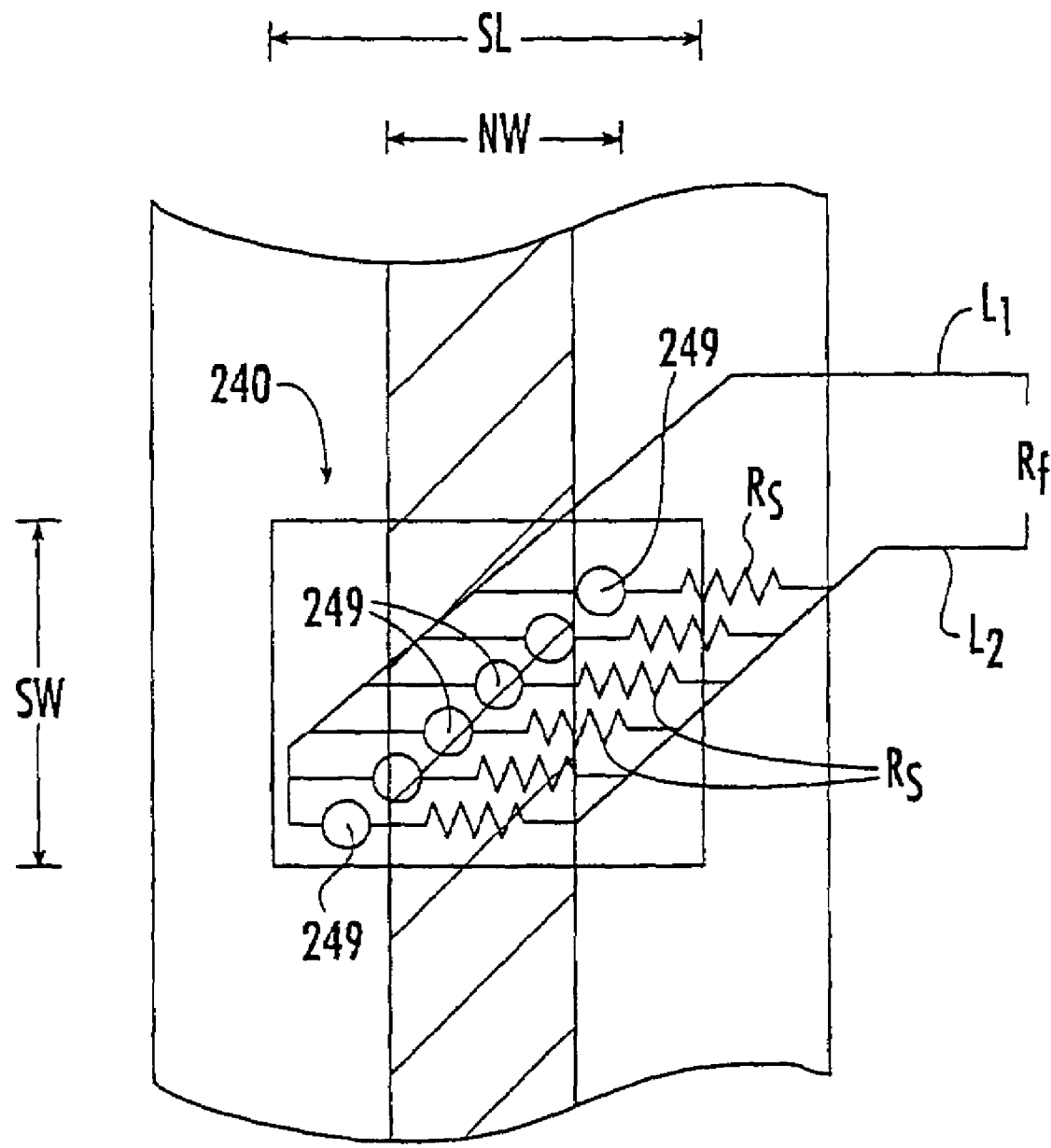
FIG. 35 is a top, schematic view of the sensing strip of FIG. 1 including a sensor according to a further embodiment of the present invention, wherein the sensor includes sensing dots arranged in a parallel circuit.

With reference to FIG. 35, a sensor 240 according to a further embodiment of the present invention is shown therein. Sensors 240 may be used in the sensing system 1 as the sensors 4. The sensor 240 includes a plurality of circular membrane switch dots 249 spaced across the sensor length SL. The dots 249 are arranged in a parallel circuit between lead lines $L_1$ and $L_2$. Resistors $R_s$, preferably of the same resistance value, are provided in line with each sensor dot 249. The sensor dots 249 act as on/off switches in the same manner as the membrane switches 215 described above, thereby providing a sensor resistance value $R_f$ between lead lines $L_1$ and $L_2$ which may be used to determine the actual nip width in the same manner as described above with respect to the sensor 210. Notably, the sensor dots 249 overlap along the sensor width SW and may also overlap along the sensor length in order to increase the sensor resolution. Cost effective conventionally available membrane switch dots are typically only available in sizes of about ⅜ inch or larger. As a result, if the sensor dots 249 were lined up end to end across the sensor length SL, the resolution of the sensor 240 would be insufficient for many applications. By configuring the dots as shown, a larger number of dots may be provided, thereby increasing the resolution of the sensor 240.

The membrane sensor dots 249 are preferably less than ⅜ inch diameter. Suitable membrane sensor dots include membrane touch switches available from Topflight of York, Pa.

In the sensors 200, 210, 220, 230, 240 and the alternative embodiments thereof described above, it may be desirable to provide means for alerting the operator or computer that the nip width may not be entirely within the sensor length. Such means may include providing sensing lines or in line resistors $R_s$ having very low or no resistance at the endmost positions of the sensor. These elements may serve to simply short the leads $L_1$, $L_2$. Upon receiving an abnormally low resistance $R_f$ signal, the associated electronics would alert the operator that the sensor is mispositioned or too small to properly measure the nip width.

Each of the above-described sensors may be provided with auxiliary sensors along the end edges thereof to determine when an end edge is positioned in the nip width and therefore mispositioned or has a length which is less than the nip width.

The foregoing is illustrative of the present invention and is not to be construed as limiting thereof. Although a few exemplary embodiments of this invention have been described, those skilled in the art will readily appreciate that may modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein. The term "comprising" as used in the claims specifies the presence of the stated features, integers, steps or components as referred to in the claims, but does not preclude the presence or addition of one or more other features, integers, steps, components or groups thereof.

What is claimed is:

1. A device for measuring a nip width and temperature between two rolls of a press nip, said device comprising:
    a) a nip width sensor assembly, said sensor assembly including:
        1) a first strip formed of a first electrically conductive material having a resistance, said first strip having a first end and a second end and a first measuring zone between said first and second ends;
        2) a second strip disposed adjacent said first strip and formed of a second electrically conductive material, said second strip having a second measuring zone disposed adjacent and substantially coextensive with said first measuring zone;
        3) a gap defined between said first and second strips and electrically isolating said first and second strips from one another; and
        4) wherein at least one of said first and second strips is deformable such that, when said device is placed in the press nip, pressure from the nip rolls forces portions of said first and second measuring zones into electrically conductive contact with one another over a contact length, the contact length substantially directly corresponding to the nip width;
    b) a resistance measuring unit that measures an electrical resistance operatively associated with the sensor assembly; and
    c) a temperature sensor operatively associated with the device that is configured to measure the temperature on one or more of the nip rolls.

2. The device of claim 1 wherein substantially no current flows through said second strip when said first and second strips are not in contact.

3. The device of claim 1 wherein said first material has a higher electrical resistance than said second material.

4. The device of claim 1 including at least one compressible edge support operative to maintain said gap when said sensor is unloaded and to allow said first and second strips to make contact when said sensor is placed in the press nip.

5. The device of claim 1 including a strip and a plurality of said nip width sensors mounted thereon.

6. The device of claim 1, further comprising a plurality of temperature sensors mounted on the strip.

7. The device of claim 1, wherein the first conductive material comprises carbon and the second conductive material comprises a material is selected from the group consisting of silver and gold.

8. The device of claim 1, further comprising first, second and third leads, the first lead being connected to the first strip adjacent the first end, the second lead being connected to the first strip adjacent the second end, and the third lead being connected to the second strip.

9. The device of claim 1, wherein the resistance unit measures resistance between the first and third leads and between the second and third leads.

10. The device of claim 1, wherein the temperature sensor comprises a thermocouple.

11. A device for measuring a nip width between two rolls of a press nip, said device comprising:
    a) a nip width sensor assembly, said sensor assembly including:
        1) a first strip formed of a first highly electrically conductive material having a resistance, said first strip having a first end and a second end and a first measuring zone between said first and second ends;
        2) a second strip disposed adjacent said first strip and formed of a second electrically conductive material, said second strip having a second measuring zone disposed adjacent and substantially coextensive with said first measuring zone;
        3) a gap defined between said first and second strips and electrically isolating said first and second strips from one another; and
        4) wherein at least one of said first and second strips is deformable such that, when said device is placed in the press nip, pressure from the nip rolls forces portions of said first and second measuring zones into electrically conductive contact with one another over a contact length, the contact length substantially directly corresponding to the nip width; and
    b) a resistance measuring unit that measures an electrical resistance operatively associated with the sensor assembly.

12. The device defined in claim 11, wherein the first highly conductive material comprises gold or silver.

13. The device of claim 11 wherein substantially no current flows through said second strip when said first and second strips are not in contact.

14. The device of claim 11 wherein said first material has a higher electrical resistance than said second material.

15. The device of claim 11 including a strip and a plurality of said nip width sensors mounted thereon.

16. The device of claim 15, further comprising a plurality of temperature sensors mounted on the strip.

17. The device of claim 11, further comprising first, second and third leads, the first lead being connected to the first strip adjacent the first end, the second lead being connected to the first strip adjacent the second end, and the third lead being connected to the second strip.

18. The device of claim 11, wherein the resistance unit measures resistance between the first and third leads and between the second and third leads.

19. A device for measuring a nip width and temperature between two rolls of a press nip, said device comprising:
  a) a nip width sensor assembly, said sensor assembly including:
    1) a first strip formed of a first electrically conductive material having a resistance, said first strip having a first end and a second end and a first measuring zone between said first and second ends;
    2) a second strip disposed adjacent said first strip and formed of a second electrically conductive material, said second strip having a second measuring zone disposed adjacent and substantially coextensive with said first measuring zone;
    3) a gap defined between said first and second strips and electrically isolating said first and second strips from one another; and
    4) wherein at least one of said first and second strips is deformable such that, when said device is placed in the press nip, pressure from the nip rolls forces portions of said first and second measuring zones into electrically conductive contact with one another over a contact length, the contact length substantially directly corresponding to the nip width;
    5) wherein electrically insulative material is disposed within the gap to maintain the gap; and
  d) a resistance measuring unit that measures an electrical resistance operatively associated with the sensor assembly.

20. The device defined in claim 19, wherein the electically insulative material takes the form of lines and/or dots.

21. The device of claim 19 wherein substantially no current flows through said second strip when said first and second strips are not in contact.

22. The device of claim 19 wherein said first material has a higher electrical resistance than said second material.

23. The device of claim 19 including a strip and a plurality of said nip width sensors mounted thereon.

24. The device of claim 19, further comprising a plurality of temperature sensors mounted on the strip.

25. The device of claim 19, wherein the first conductive material comprises carbon and the second conductive material comprises a material is selected from the group consisting of silver and gold.

26. The device of claim 19, further comprising first, second and third leads, the first lead being connected to the first strip adjacent the first end, the second lead being connected to the first strip adjacent the second end, and the third lead being connected to the second strip.

27. The device of claim 19, wherein the resistance unit measures resistance between the first and third leads and between the second and third leads.

* * * * *